United States Patent
Anuskiewicz et al.

(10) Patent No.: US 11,272,674 B1
(45) Date of Patent: Mar. 15, 2022

(54) AXIALLY MOVING SERVICE VALVE FOR AN IRRIGATION SPRINKLER

(71) Applicant: Hunter Industries, Inc., San Marcos, CA (US)

(72) Inventors: Ronald H. Anuskiewicz, San Diego, CA (US); David W. Davidson, Del Mar, CA (US); Michael A. Huelsman, Carlsbad, CA (US)

(73) Assignee: Hunter Industries, Inc., San Marcos, CA (US)

( * ) Notice: Subject to any disclaimer, the term of this patent is extended or adjusted under 35 U.S.C. 154(b) by 915 days.

(21) Appl. No.: 15/819,644

(22) Filed: Nov. 21, 2017

(51) Int. Cl.
| | |
|---|---|
| *A01G 25/16* | (2006.01) |
| *A01G 25/02* | (2006.01) |
| *B05B 12/08* | (2006.01) |
| *B01D 35/30* | (2006.01) |
| *F16K 11/085* | (2006.01) |
| *B05B 15/40* | (2018.01) |
| *B05B 3/04* | (2006.01) |
| *F16K 31/06* | (2006.01) |
| *B05B 15/70* | (2018.01) |

(52) U.S. Cl.
CPC ............ *A01G 25/16* (2013.01); *A01G 25/02* (2013.01); *B01D 35/30* (2013.01); *B05B 12/087* (2013.01); *B05B 15/40* (2018.02); *F16K 11/0853* (2013.01); *B01D 2201/301* (2013.01); *B05B 3/0431* (2013.01); *B05B 15/70* (2018.02); *F16K 31/06* (2013.01)

(58) Field of Classification Search
None
See application file for complete search history.

(56) References Cited

U.S. PATENT DOCUMENTS

| | | | | |
|---|---|---|---|---|
| 3,797,525 | A | * | 3/1974 | Lieser ................. F16K 11/02 137/625.6 |
| 3,978,707 | A | * | 9/1976 | Grove ................ G01F 25/0015 73/1.16 |
| 4,190,201 | A | * | 2/1980 | Geiger ................ A01G 25/167 239/65 |
| 6,227,455 | B1 | | 5/2001 | Loren et al. |
| 6,491,235 | B1 | * | 12/2002 | Scott ..................... B05B 1/30 239/206 |
| 9,169,944 | B1 | | 10/2015 | Dunn et al. |
| 9,539,602 | B2 | | 1/2017 | Wright, III et al. |
| 9,578,817 | B2 | | 2/2017 | Dunn et al. |
| 9,987,649 | B2 | | 6/2018 | Wright, III et al. |
| 10,328,444 | B2 | | 6/2019 | Wright, III et al. |
| 10,556,248 | B2 | | 2/2020 | Wright, Iii et al. |

* cited by examiner

*Primary Examiner* — Jason M Greene
*Assistant Examiner* — Eric J McCullough
(74) *Attorney, Agent, or Firm* — Knobbe Martens Olson & Bear, LLP

(57) ABSTRACT

A flow control system for an irrigation sprinkler can include a service valve having an inlet, a first fluid port, a second fluid port, a third fluid port, and/or a valve piston having a valve piston inlet and a valve piston outlet. The system can include a pilot valve and a vent line. The system can include a filter in fluid communication with the inlet of the service valve. The valve piston can be configured to move vertically with respect to the first, second, and third fluid ports between first, second, and third valve positions.

20 Claims, 29 Drawing Sheets

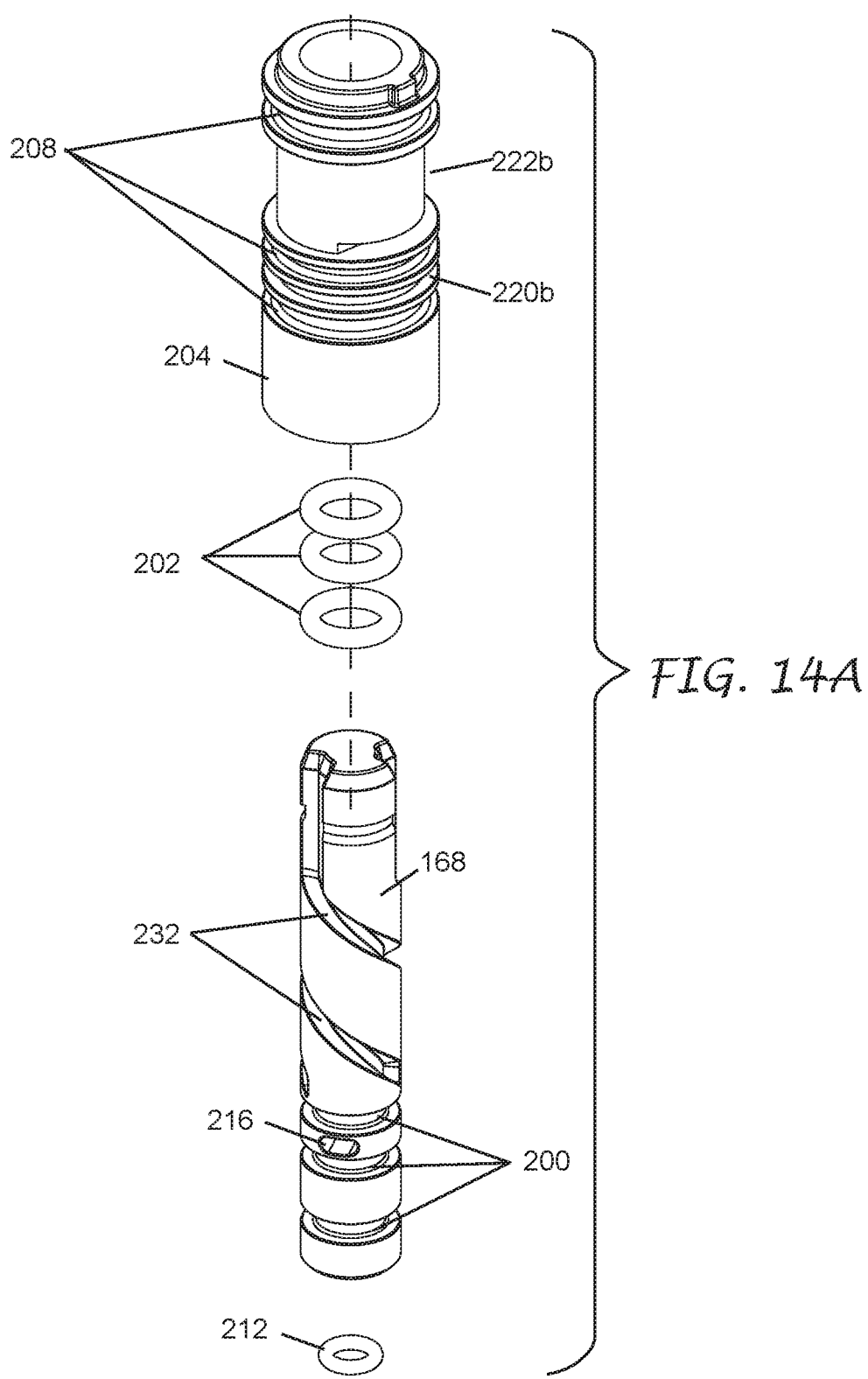

Section 16-16

Section 18-18

Section 20-20

AXIALLY MOVING SERVICE VALVE FOR AN IRRIGATION SPRINKLER

CROSS-REFERENCE TO RELATED APPLICATION

This application is related by subject matter to U.S. patent application Ser. No. 13/680,326, filed Nov. 19, 2012, titled VALVE-IN-HEAD IRRIGATION SPRINKLER WITH SERVICE VALVE, now U.S. Pat. No. 9,169,944, and to U.S. patent application Ser. No. 14/921,353, filed Oct. 23, 2015, titled VALVE-IN-HEAD IRRIGATION SPRINKLER WITH SERVICE VALVE, now U.S. Pat. No. 9,578,817, each of which are incorporated by reference herein and made part of the present disclosure.

TECHNICAL FIELD

The present inventions relate to apparatus for irrigating turf and landscaping. Such apparatuses may include a service valve to allow for repair, replacement, and or testing of parts.

BACKGROUND

In many parts of the United States, rainfall is insufficient and/or too irregular to keep turf and landscaping green and therefore irrigation systems are installed. In many cases, it is desirable to repair or replace components of the irrigation systems, including sprinkler components, in the field. Requiring that sprinklers be dug up from the ground or that entire irrigation systems be shut off to replace components in a single sprinkler can drive up the cost of repair.

SUMMARY

According some embodiments, a sprinkler can include a turbine, a nozzle, and a gear drive. In some instances, the sprinkler can also include a reversing mechanism. The gear drive can rotatably couple the turbine and the nozzle. The gear drive and reversing mechanism can be coupled to shift a direction of rotation of an output stage of the gear drive. The sprinkler may also include in inlet valve and an inlet valve actuator components. In some embodiments, the inlet valve actuator components may include an electric solenoid pilot valve, and a service valve. In some embodiments, the service valve may allow a user to manually turn the sprinkler on to allow the user to adjust the arc or range of the sprinkler. In some embodiments, the service valve may allow a user to manually turn the sprinkler off to allow the user to keep the sprinkler off regardless of the electric signals from the irrigation controller. In some embodiments, the service valve may allow a user to manually turn the sprinkler off to allow the user to service certain internal components of the sprinkler without disconnecting it from a pressurized water source. In some embodiments, the service valve may allow a user to manually turn the sprinkler to an automatic position to allow the sprinkler to turn on and off in response to the electric signals from the irrigation controller.

A flow control system for an irrigation sprinkler can include a service valve. The service valve can include an inlet, a first fluid port, a second fluid port, and/or a valve piston. The valve piston can have a valve piston inlet and a valve piston outlet. In some embodiments, the system includes a filter in fluid communication with the inlet of the service valve. The system can include a vent line in fluid communication with the first fluid port. In some embodiments, the system includes a pilot valve in fluid communication with the second fluid port. In some embodiments, the valve piston is configured to move vertically with respect to the first and second fluid ports between first and second valve positions. In some embodiments, the valve piston is configured to permit fluid communication between the first fluid port and the valve piston inlet when the valve piston is in the first position. In some embodiments, the valve piston is configured to permit fluid communication between the second fluid port and the valve piston inlet when the valve piston is in the second position. In some embodiments, the valve piston is configured to inhibit fluid communication between the valve piston inlet and each of the first and second fluid ports when the valve piston is in a third position.

In some embodiments, the system includes a pressure regulator in fluid communication with the first fluid port and configured to regulate pressure of fluid between the first fluid port and the vent line.

In some embodiments, the first fluid port is in fluid communication with a third fluid port.

4 In some embodiments, the service valve includes a fluid chamber at least partially surrounding a portion of the valve piston and in fluid communication with the first and third fluid ports.

In some embodiments, the system includes a sprinkler inlet valve in fluid communication with valve piston inlet.

In some embodiments, the sprinkler inlet valve includes a chamber positioned on a side of a valve seat opposite a sprinkler water inlet. In some embodiments, the chamber is in fluid communication with the valve piston inlet via a communication line.

In some embodiments, the vent line is in fluid communication with soil surrounding the fluid control system.

In some embodiments, the vent line comprises a first end and a second end, the first end connected to the pressure regulator and the second end positioned at a lower end of a sprinkler housing and in fluid communication with the ambient environment surrounding the sprinkler housing.

According to some variants, a flow control system for an irrigation sprinkler includes a service valve. The service valve can include a first port; a second port; a fluid inlet; a fluid outlet; and a service valve stem. The service valve stem can be configured to transition between a first service position, a second service position, and a third service position. In some embodiments, the system includes a solenoid module. The solenoid module can include a solenoid valve body. In some embodiments, the solenoid module includes a first fluid path in communication with the second port and extending through the solenoid valve body. The solenoid module can include a second fluid path in communication with the first port and extending through the solenoid valve body. In some embodiments, the solenoid module includes a solenoid connected to the solenoid valve body and configured to transition between a first position and a second position in response to signals from a controller, the solenoid permitting fluid flow from the first fluid path to the second fluid path when in the first position and inhibiting fluid flow between the first fluid path and the second fluid path when in the second position. The system can include a filter in fluid communication with the fluid inlet of the service valve. The filter can include a filter housing and a filter screen positioned at least partially within the filter housing. In some embodiments the service valve is configured to permit fluid flow directly from the fluid inlet to the fluid outlet when in the first service position, the service valve permitting fluid flow from the fluid inlet to the first fluid path via the second port when in the second service position, and the service valve obstructing fluid flow from the fluid inlet to each of the first port, the second port, and the fluid outlet when in the third service position. In some embodiments, the filter can be removed from the filter housing without moving the solenoid with respect to the solenoid valve body.

In some embodiments, the filter housing extends from the service valve in a direction parallel to an axis along which the solenoid travels between the first and second positions.

In some embodiments, the solenoid is configured to move along a solenoid axis between the first and second positions, and wherein the filter is not positioned on the solenoid axis.

In some embodiments, the filter is positioned between the fluid inlet of the service valve and a communication line with an inlet valve of a sprinkler.

In some embodiments, the filter is positioned on a side of the service valve opposite the service valve stem.

According to some variants, a flow control system for an irrigation sprinkler includes a service valve. The service valve can include a service valve housing having a first fluid port and a second fluid port. In some embodiments, the service valve includes a service valve piston positioned at least partially within the service valve housing and configured to linearly reciprocate with respect to the service valve housing between first, second, and third positions. The valve piston can include a valve piston inlet and a valve piston outlet. In some embodiments, the system includes a filter in fluid communication with the service valve. The system can include a pilot valve in fluid communication with the second fluid port. In some embodiments, the system includes a vent line in fluid communication with the first fluid port. In some embodiments, the valve piston outlet is in fluid communication with the first fluid port when the service valve piston is in the first position. In some embodiments, the valve piston outlet is in fluid communication with the second fluid port when the service valve piston is in the second position. In some embodiments, the valve piston outlet is blocked when the service valve piston is in the third position.

In some embodiments, the system includes a pressure regulator having a pressure regulator housing in fluid communication with the first fluid port.

In some embodiments, the pressure regulator housing is formed integral with the service valve housing.

In some embodiments, the filter is configured to filter all water passing into the service valve via the valve piston inlet.

In some embodiments, the filter comprises a filter post and a filter screen mounted to the filter post.

In some embodiments, the filter post is formed integrally with one or more components of the service valve

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

FIG. 14A is an enlarged view of the detail 14a in FIG. 14.

DETAILED DESCRIPTION

Irrigation sprinklers can be used to distribute water to turf and other landscaping. Types of irrigations sprinklers include pop-up, rotor-type, impact, spray and/or rotary-stream sprinklers. In some applications, an irrigation system can include multiple irrigation sprinklers 1 used to water a targeted area. One or more controllers (e.g., wireless and/or wired controllers) can be used to control the operation of multiple irrigation sprinklers. For example, one or more controllers can control when each of the sprinklers of the irrigation system transitions between an irrigating (e.g., ON) configuration and a non-irrigating (e.g., OFF) configuration. In some embodiments, the one or more controllers control the amount of water distributed by the sprinklers. The water source 15 for the irrigation system can be provided by a single water source, such as a well, a body of water, or water utility system. In some applications, multiple water sources are used.

Figure 1:
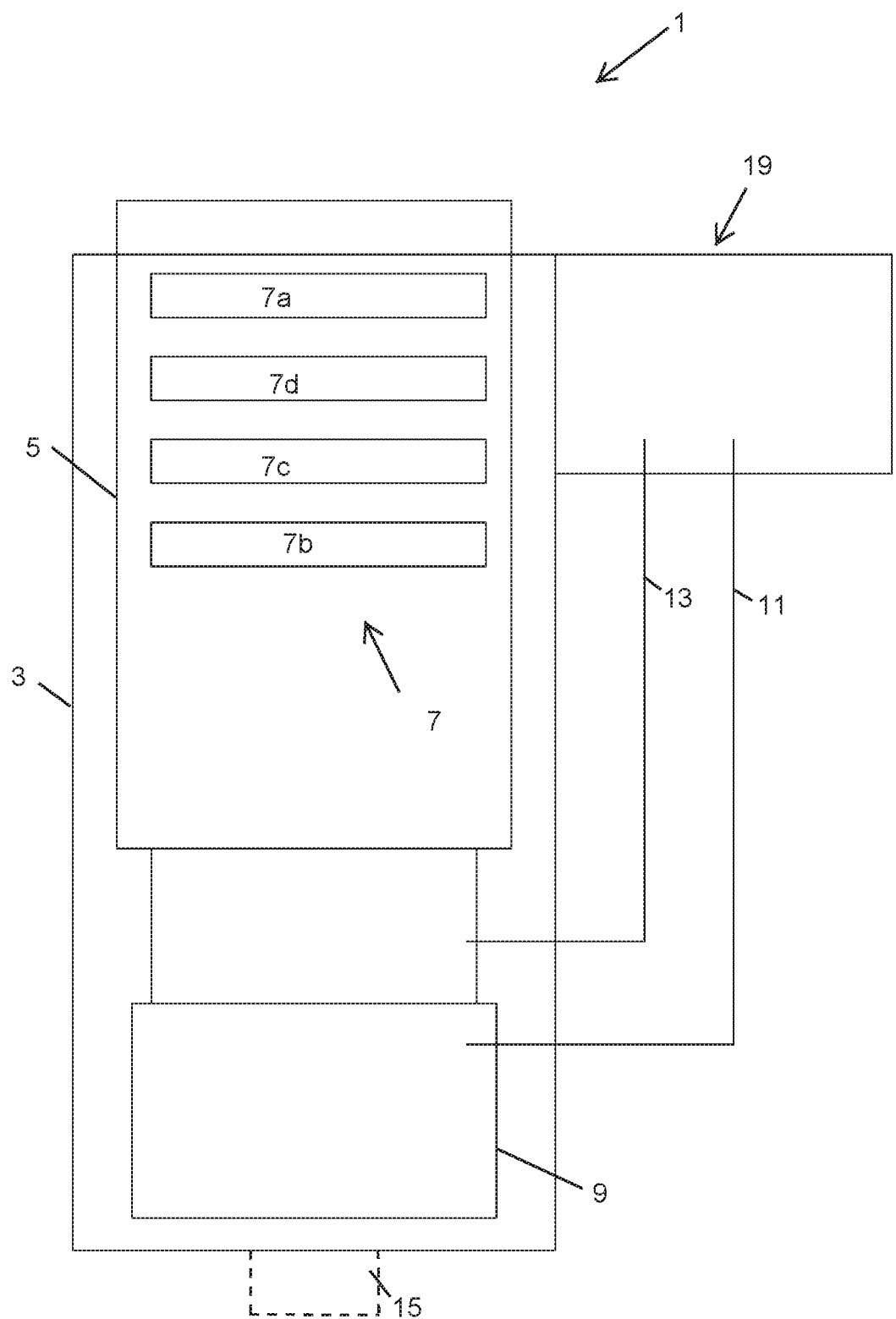
FIG. 1 is a schematic illustration of an irrigation sprinkler.

As schematically illustrated in FIG. 1, an irrigation sprinkler 1 can include an outer case 3. The outer case 3 can have a generally cylindrical shape or some other appropriate shape. A riser 5 can be positioned at least partially within the outer case 3. In some embodiments, such as pop-up sprinklers, the riser 5 is biased to a contracted or non-irrigating position within the outer case 3. The riser 5 may be biased to the contracted position by gravity and/or biasing structures such as springs. In some embodiments, the riser 5 transitions to an extended or irrigating position when pressure (e.g., water pressure) within the outer case 3 is high enough to overcome a biasing force on the riser 5. In some embodiments (e.g., non-pop-up sprinklers) the riser 5 is fixed in the extended position.

One or more mechanical components 7 can be positioned within the riser 5 and/or within the outer case 3. For example, the riser 5 can include an outlet 7a (e.g., a nozzle or outlet port). In some embodiments, the sprinkler 1 includes a plurality of outlets. The outlet 7a can direct water from the irrigation sprinkler 1 when the sprinkler 1 is ON. In some embodiments, the outlet 7a is connected to an outlet housing (e.g., a nozzle turret). The outlet housing and/or outlet 7a can be rotatable or otherwise moveable with respect to the riser 5 and/or outer case 3.

In some embodiments, the irrigation sprinkler 1 includes a turbine 7b. The turbine 7b can rotate in response to water entering an inlet end of the riser 5 and/or the outer case 3. The turbine 7b can be configured to rotate the outlet 7a. In some embodiments, a gear train reduction 7c is connected to the turbine 7b via an input shaft or otherwise. The gear train reduction 7c can transfer torque from the rotating turbine 7b to the outlet housing and/or outlet 7a via an output shaft, output clutch, or other output structure.

The sprinkler 1 can include a reversing mechanism 7d. The reversing mechanism 7d can be positioned within the riser 5 and/or within the outer case 3. In some embodiments, the reversing mechanism 7d is connected to the gear train reduction 7c and/or to the outlet 7a. The reversing mechanism 7d can be used to reverse the direction of rotation of the outlet 7a. In some embodiments, the reversing mechanism 7d reverses the direction of rotation of the outlet 7a without changing the direction of rotation of the turret 7b. In some embodiments, the reversing mechanism 7d reverses the direction of rotation of the outlet 7a by reversing the direction of rotation of the turret 7b.

In some embodiments, the reversing mechanism 7d reverses the direction of rotation of the outlet 7a via manual input. For example, a tool may be used to adjust the reversing mechanism 7d to reverse the direction of rotation of the outlet 7a. In some embodiments, the reversing mechanism 7d reverses the direction of rotation of the outlet 7a automatically via selected arc limiters. In some cases, at least one of the selected arc limiters can be adjusted to a desired position.

In some embodiments, the sprinkler 1 can include an inlet valve 9. In some embodiments, the inlet valve 9 may be hydraulically connected to a service valve 21 (FIG. 2) and other inlet valve actuation components via a communication tube 11. In some cases, a vent line 13 is provided from the inlet valve actuation components to an area downstream of the inlet valve 9. In some embodiments, the vent line 13 may vent to atmosphere. In some embodiments, the inlet valve actuation components may be housed in a compartment 19 attached to, or formed integrally into the outer case 3.

Water may be provided to the sprinkler 1 via one or more water sources 15. The water source 15 may be fluidly connected to the outer case 3 and/or to the riser 5.

Figure 2:
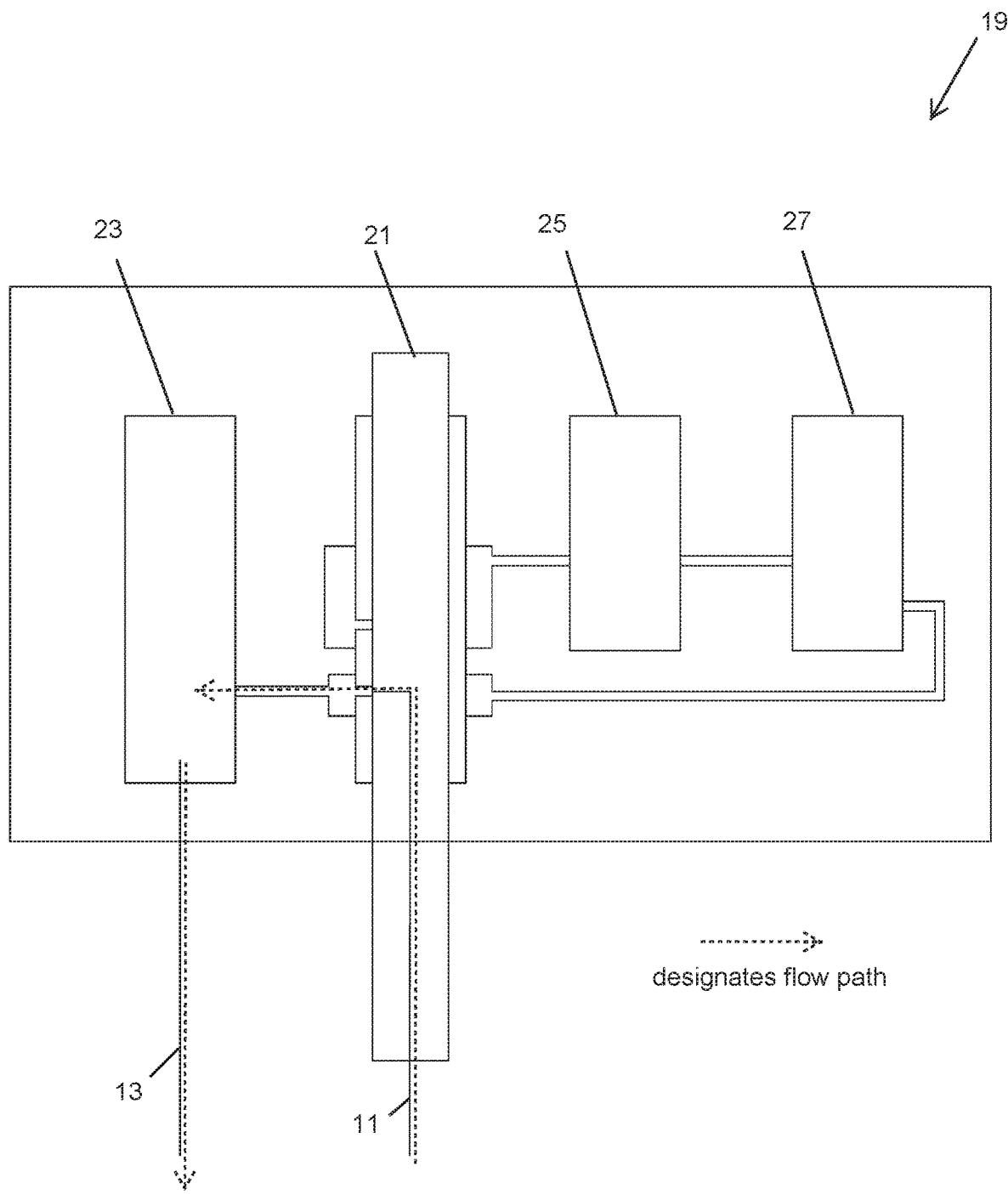
FIG. 2 is a schematic illustration of an inlet valve control system attached to the irrigation sprinkler of FIG. 1 in the ON position
Figure 3:
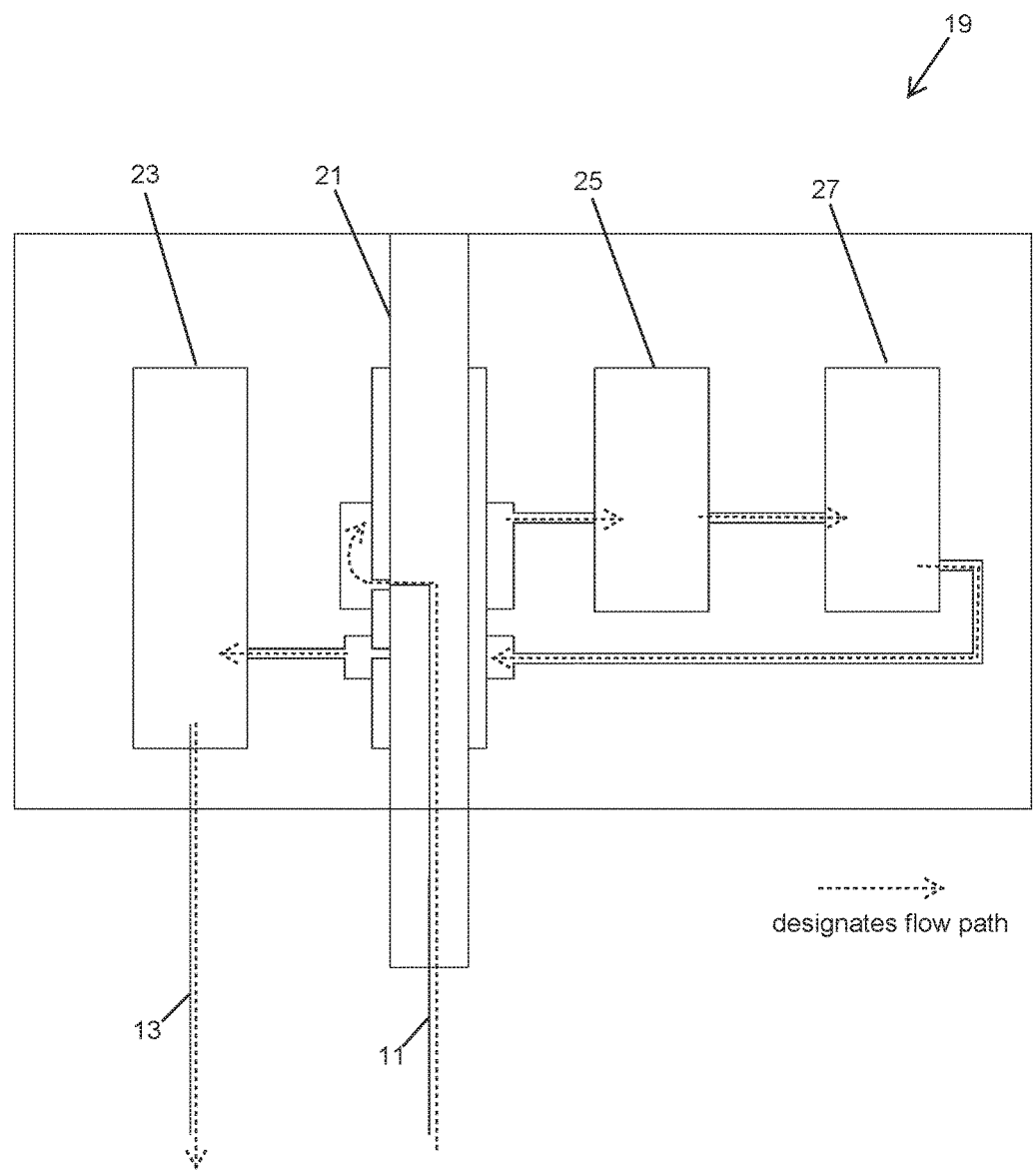
FIG. 3 is a schematic illustration of an inlet valve control system attached to the irrigation sprinkler of FIG. 1 in the AUTO position
Figure 4:
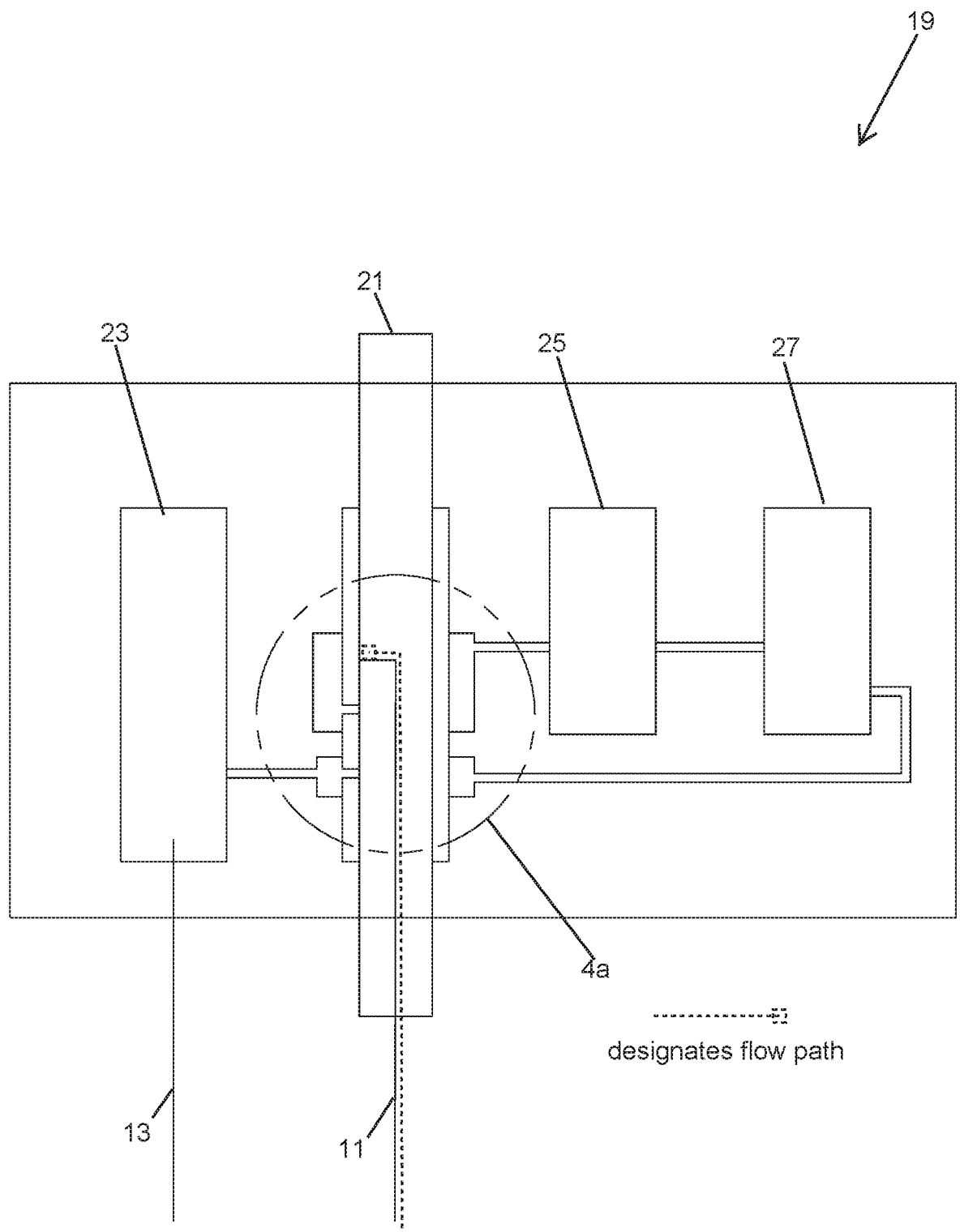
FIG. 4 is a schematic illustration of an inlet valve control system attached to the irrigation sprinkler of FIG. 1 in the OFF position
Figure 4A:
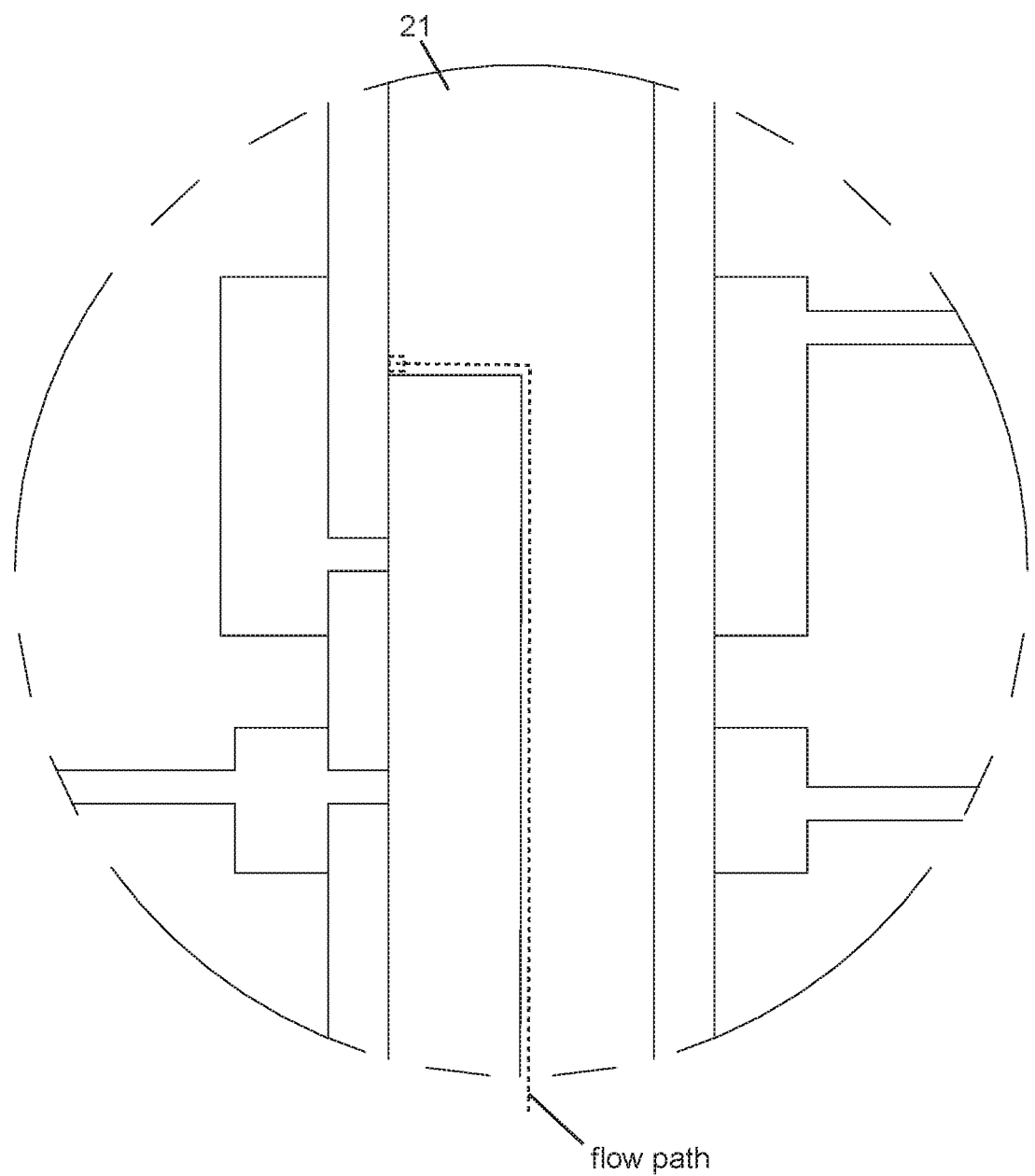
FIG. 4A is an enlarged portion of the detail 4a FIG. 4.

As schematically illustrated in FIGS. 2-4, the inlet valve actuator components may include a service valve 21. As illustrated in FIG. 2, the service valve 21 can include an axially-moving (e.g., linearly reciprocating) valve body or valve stem. The service valve 21 may be configured to transition between two or more configurations. For example, the service valve can be configured in a first position to vent water from a chamber at the top of the inlet valve 9 through the communications line 11 to the vent line 13. This releases holding pressure on the top of the inlet valve 9 and can cause the inlet valve 9 to open via the inlet water pressure from the water source 15. In some embodiments, a pressure regulator 23 may be positioned between the communications line 11 and the vent 13. The pressure regulator will regulate the pressure on the top of the inlet valve 9 and thus the inlet valve 9 will regulate the water pressure entering the riser 5.

As illustrated in FIG. 3, the service valve 21 may be transitioned to a second configuration to direct the water flow from the communication line 11 to a solenoid pilot valve 27. In some embodiments, a filter may 25 may be positioned between the communication line 11 and the solenoid pilot valve 27. When the solenoid pilot valve 27 is actuated by an electric signal, the solenoid pilot valve 27 will open and vent water from a chamber at the top of the inlet valve 9 through the communications line 11 to the vent line 13. This releases holding pressure on the top of the inlet valve 9 and can cause the inlet valve 9 to open via the inlet water pressure from the water source 15. When the solenoid pilot valve is signaled to close, the water from the communications line 11 will be blocked from going to the vent line 13 and the inlet valve 9 will close and prevent water from going through the sprinkler 1. In some embodiments, a pressure regulator 23 may be positioned between the communications line 11 and the vent 13. The pressure regulator will regulate the pressure on the top of the inlet valve 9 and thus the inlet valve 9 will regulate the water pressure entering the riser 5.

As illustrated in FIG. 4, the service valve 21 may be placed in a third configuration to block any water flow from the communication line 11 to the vent line 13, to the filter 25, to the solenoid pilot valve 27, and/or to the pressure regulator 23. In this position, the inlet valve 9 is maintained in a closed position to allow for service of the property, the riser 5, the inlet valve actuator components 23, 25, and 27, and/or other sprinkler components.

Figure 5:
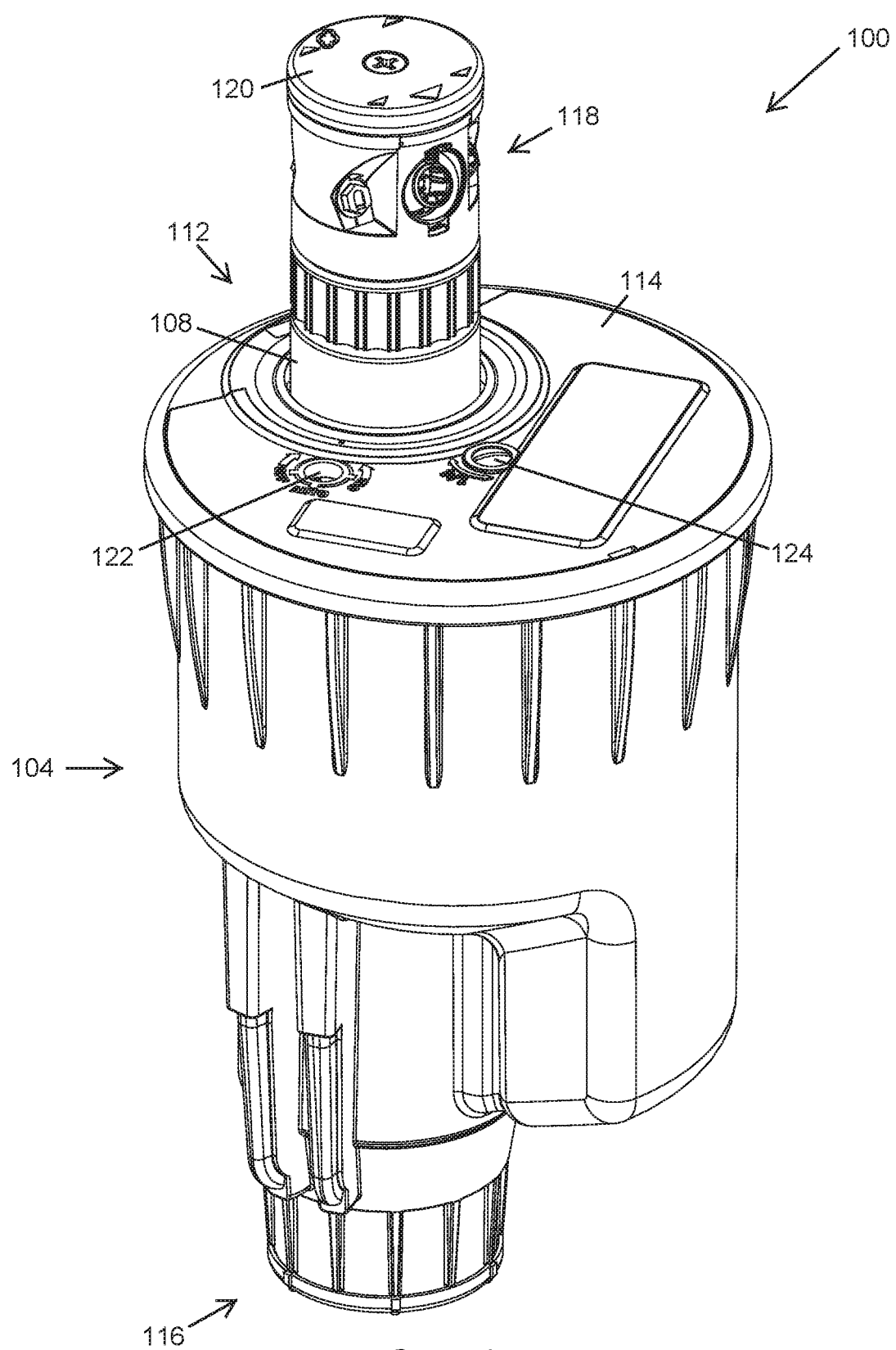
FIG. 5 is an isometric view of a top serviceable sprinkler incorporating a first embodiment of the present invention that utilizes a 3-way service valve.
Figure 6:
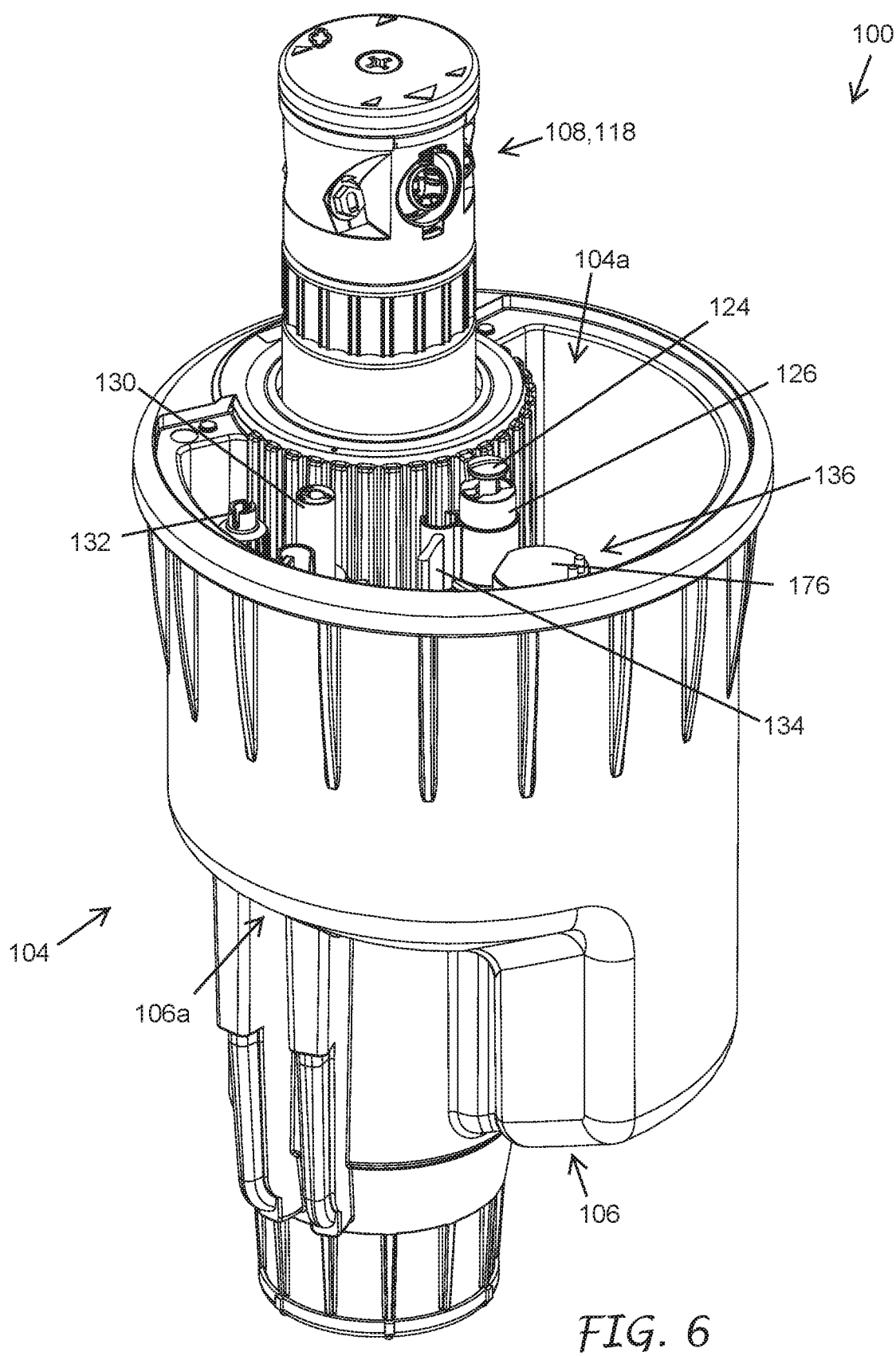
FIG. 6 is an isometric view of the top serviceable sprinkler of FIG. 1 with the access cover removed
Figure 7:
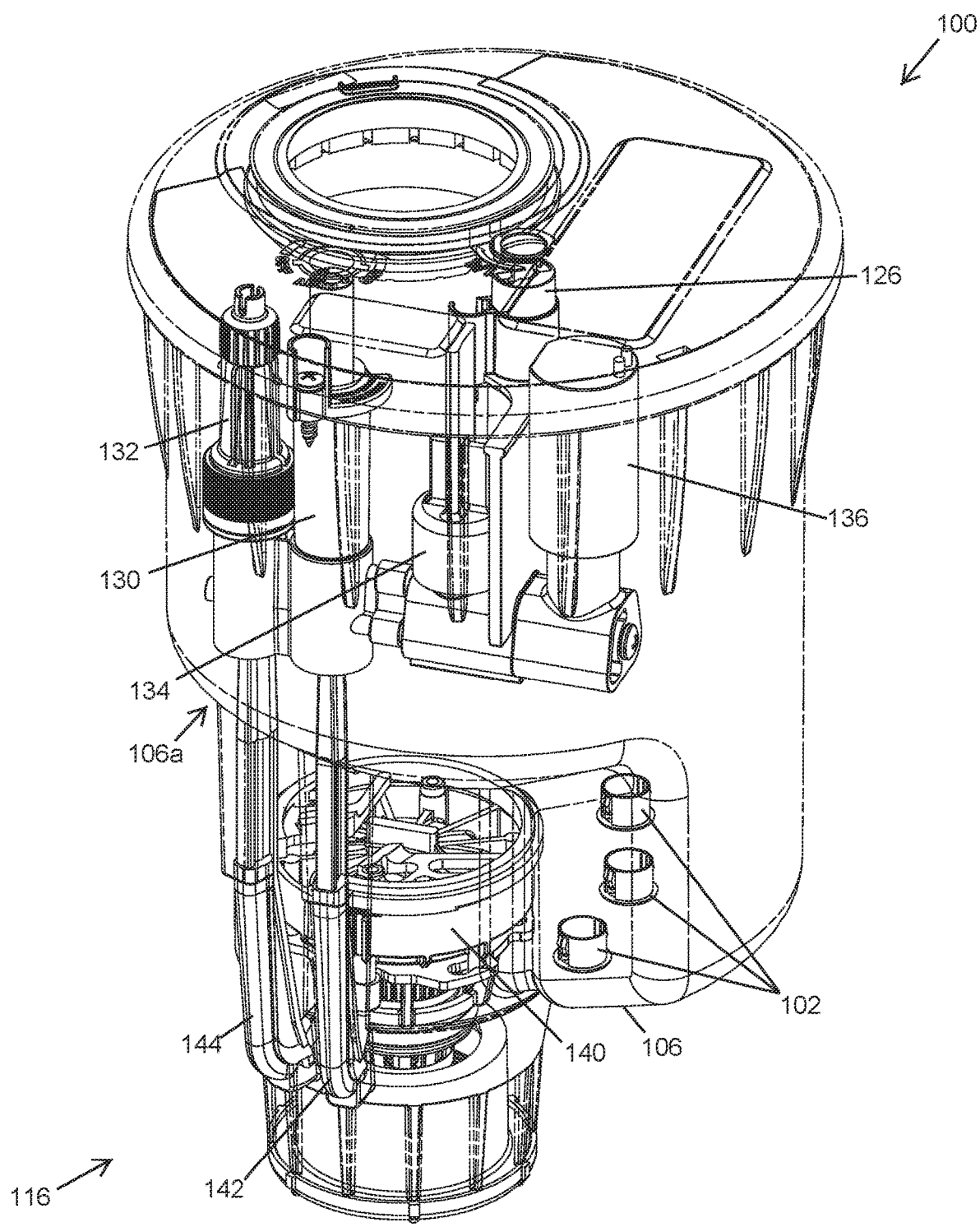
FIG. 7 illustrates the outer case and ground support flange of the sprinkler of FIG. 1 in phantom lines to reveal details of its inner components.

In some embodiments, as illustrated in FIGS. 5-7, the inlet valve actuator components are used in conjunction with a pop-up type sprinkler 100. The sprinkler 100 can include a sprinkler housing 104. The sprinkler housing 104 can be at least partially buried when installed at an irrigation site. The sprinkler 100 can include a riser 108 configured to extend through a riser aperture 112 in the sprinkler housing 104. In some embodiments, the riser 108 is configured to transition into and out from the housing 104 via the riser aperture 112. The sprinkler 100 can include at nozzle assembly 118 connected to the riser 108. In some embodiments, the nozzle assembly 118 includes one or more primary nozzles. As illustrated, the nozzle assembly 118 can include one or more secondary nozzles. The nozzle assembly 118 can comprise a rotatable turret configured to rotate with respect to the housing 108 and/or with respect to the riser 108 during operation of the sprinkler 100. The sprinkler 100 can include a riser cap 120 configured to protect a top end of the nozzle assembly 118.

The sprinkler housing 104 can include a water inlet. In some embodiments, the water inlet is at or near the lower end 116 of the sprinkler housing 104. In some embodiments, the housing access cover 114 or some other portion of the housing 104 includes one or more access apertures 122, and cover locks 124. In some instances, the cover lock can be a screw, a quarter turn fastener, or any other appropriate releasable fastener that holds the cover in place. The access apertures 122 can facilitate adjustment and/or inspection of components within the sprinkler housing 104 without requiring removal of the housing access cover 114 from the sprinkler housing 104. In some instances, the cover lock 124 can facilitate removal of the cover for inspection or servicing components under the cover 114. In some embodiments, removing the cover 114 exposes a cavity 104a within the sprinkler housing 104. In some embodiments, the cavity 104a may have bottom surface 106. In some embodiments, the cavity 104a may have a second bottom surface 106a. In some embodiments, the cavity 104a may have more than one depth. In some embodiments, the portion of the cavity 104a formed by the bottom 106a may be a first depth and the portion of the cavity 104a formed by the bottom 106a may be a second depth. The bottom surfaces 016 and/or 106a may incorporate attachment points to attach various control components. The bottom surface 106 and/or 106a may have holes or other access features to allow wiring to enter or exit the cavity 104a. In some embodiments, the bottom surfaces 106 and/or 106a may be sloped to direct any water that enters the cavity to the lowest part of the cavity 104a. In some embodiments, apertures in the bottom floor 106 or 106a may allow water to escape from the cavity 104a to the soil below, or surrounding, the sprinkler housing 104.

As illustrated in FIGS. 6-7, one or more of the inlet valve actuator components are positioned at least partially within the sprinkler housing 104. For example, one or more of the service valve 130, pressure regulator 132, filter 134, and solenoid operated pilot valve 136 are positioned within the sprinkler housing 104. Positioning some or all of the valve actuator components within the sprinkler housing 104 can reduce the need for lengthy fluid lines between the inlet valve actuator components and other components of the sprinkler 100.

Positioning inlet valve actuator components within the sprinkler housing 104 can facilitate close proximity between the actuator components and the inlet valve 140. This can allow for a shortened communication line 142 between the inlet valve 140 and the service valve 130. In some embodiments, one or more filters can be positioned in the communication line 142 or otherwise between the inlet valve 140 and the service valve 130.

In some embodiments, the cover lock 124 may removably interface with a lock receiver 126 to secure the cover 114 to the sprinkler body 104, and allow the cover 114 to be removed for servicing components located beneath the cover 114. In some embodiments, one or more access plugs 102 may be removed from a floor 106 of the sprinkler housing 104 to facilitate wiring from an irrigation controller or from or to another sprinkler, decoder, or other device in an irrigation system. The wiring may be used to activate or deactivate a pilot valve solenoid 176. In some instances, the wiring may be providing power and signals to a decoder module (not illustrated) that activates the pilot valve solenoid 176. In some instances, water that enters the cavity 104a may drain past the plugs 102, or past the wiring that passes through the apertures that are exposed when one or more of the plugs 102 are removed.

Figure 8A:
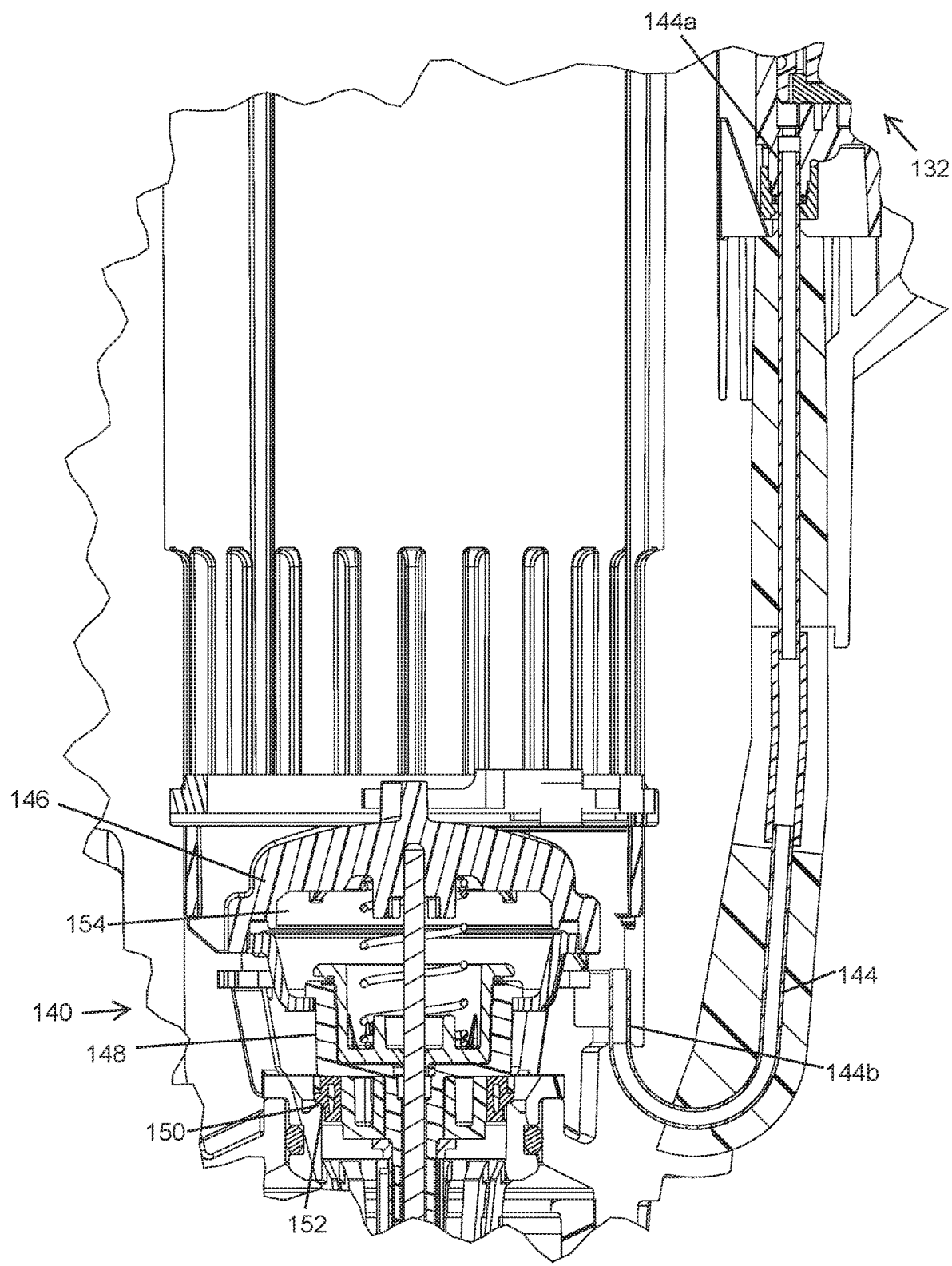
FIG. 8A is a sectioned view of an inlet valve with a vent line positioned downstream of the inlet valve.
Figure 8B:
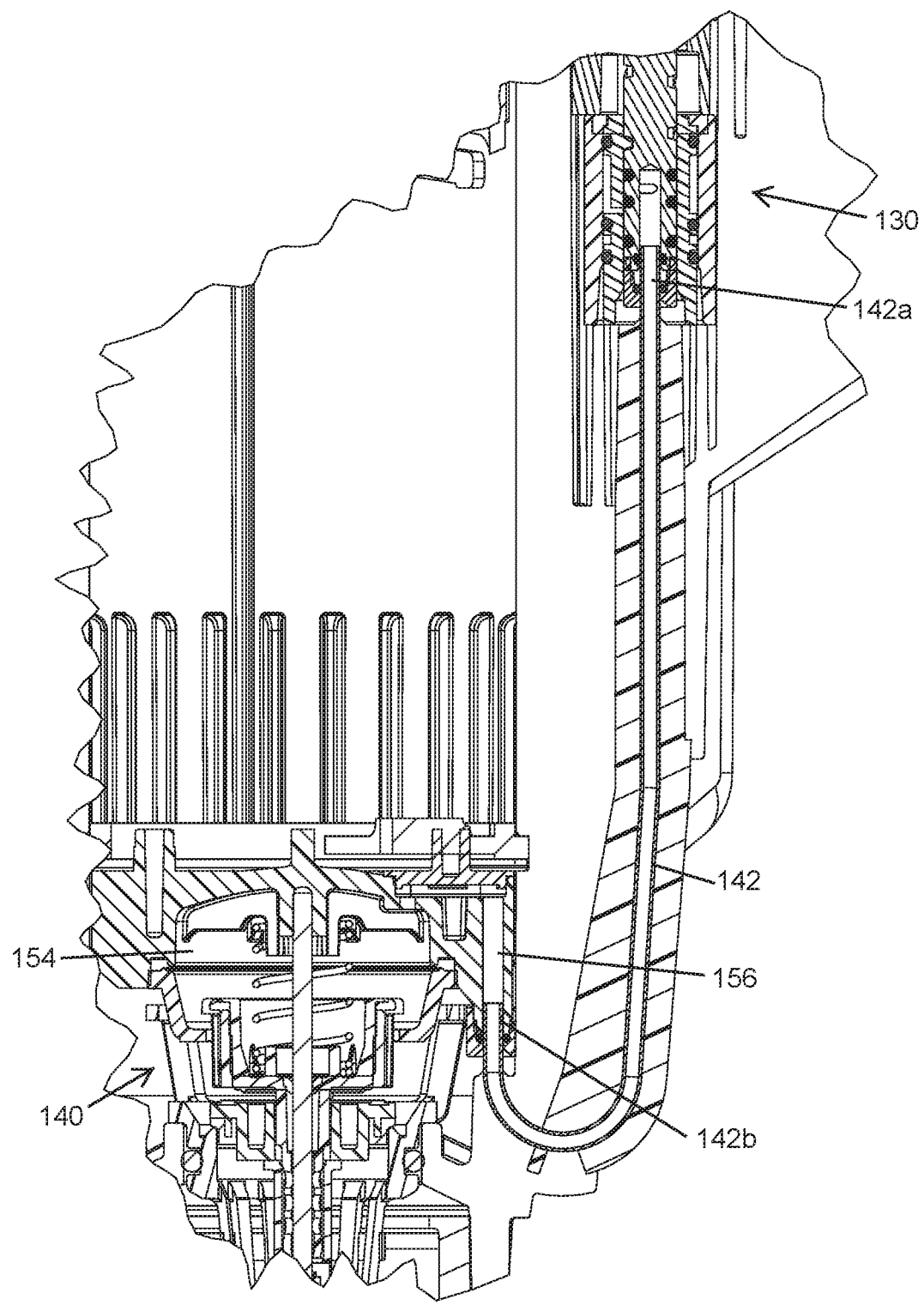
FIG. 8B is a sectioned view of an inlet valve with a hydraulic communication line to a selector valve.

As illustrated in FIGS. 8A-8B, the inlet valve 140 can include an inlet valve housing 146. The inlet valve 140 can include a moveable valve body 148 configured to move away from a valve seat 150 when the pilot valve solenoid 176 is activated. In some embodiments, a pressure regulator 132 may regulate the pressure in the upper chamber 154. The differential pressure between the upper cavity and the water entering the inlet of the valve may cause movement of the valve body 148 with respect to the valve seat 150 which can meter the water flow through the inlet valve 140 to maintain a desired pressure or range of pressures within the rotor 108. The inlet valve body 148 can include a seal 152 (e.g., an annular seal) configured to contact the inlet valve seat 150 and close the valve 140 when the pilot valve solenoid 176 is deactivated. The seal 152 and/or valve seat 150 can be constructed from a flexible, elastomeric, and/or resilient material. Non-limiting examples of inlet valves compatible with the present disclosure are discussed in U.S. Pat. No. 5,927,607 entitled "SPRINKLER WITH VELOCITY CONTROL DISC," issued Feb. 26, 1998; U.S. Pat. No. 6,227,455 entitled "SUB-SURFACE SPRINKLER WITH SURFACE ACCESSIBLE VALVE ACTUATOR COMPONENTS," issued Jan. 25, 2000; U.S. Pat. No. 6,491,235 entitled "POP-UP SPRINKLER WITH TOP SERVICEABLE DIAPHRAGM VALVE MODULE," issued Sep. 12, 2000; U.S. Pat. No. 6,457,656 entitled "POP-UP SPRINKLER WITH INWARDLY DEFLECTABLE VELOCITY CONTROL DISC," issued Sep. 15, 2000; U.S. Pat. No. 7,303,147 entitled "SPRINKLER HAVING VALVE MODULE WITH RECIPROCATING VALVE SEAT," issued Feb. 28, 2006; and U.S. application Ser. No. 15/407,938, filed Jan. 17, 2017. Each of the above-listed patents and patent applications are hereby incorporated by reference herein in their entirety.

In some embodiments, the vent line 144 from the inlet valve actuator components (e.g., from the solenoid operated pilot valve 136, from the service valve 130, and/or from the pressure regulator 132) extends down to a point at or near the lower end 116 of the sprinkler housing 104. For example, as illustrated in FIG. 8A, the vent line 144 can extend from the pressure regulator 132 to a point in the riser 108 outside of the inlet valve 140. More specifically, a first end 144a of the vent line 144 can mate with the pressure regulator 132, with the service valve 130, and/or with the solenoid operated pilot valve 136, and the second end 144b of the vent line 144 can communicate with a region of low pressure (e.g., outside of and downstream of the inlet valve 140). In some embodiments, the vent line 144 includes two or more tubing portions connected via one or more connectors.

The communication line 142 between the inlet valve actuator components and the inlet valve 140 can, in some embodiments, extend along the sprinkler housing 104. As illustrated in FIG. 8B, the communication line 142 can have a first end 142a connected to an inlet valve actuator component (e.g., the service valve 130) and a second end 142b connected to the inlet valve 140. The second end 142b of the communication line 142 can mate with an access port 156 of the inlet valve 140. The access port 156 can facilitate fluid communication between the communication line 142 and the interior of the inlet valve (e.g., the upper chamber 154 of the inlet valve 140).

Figure 9:
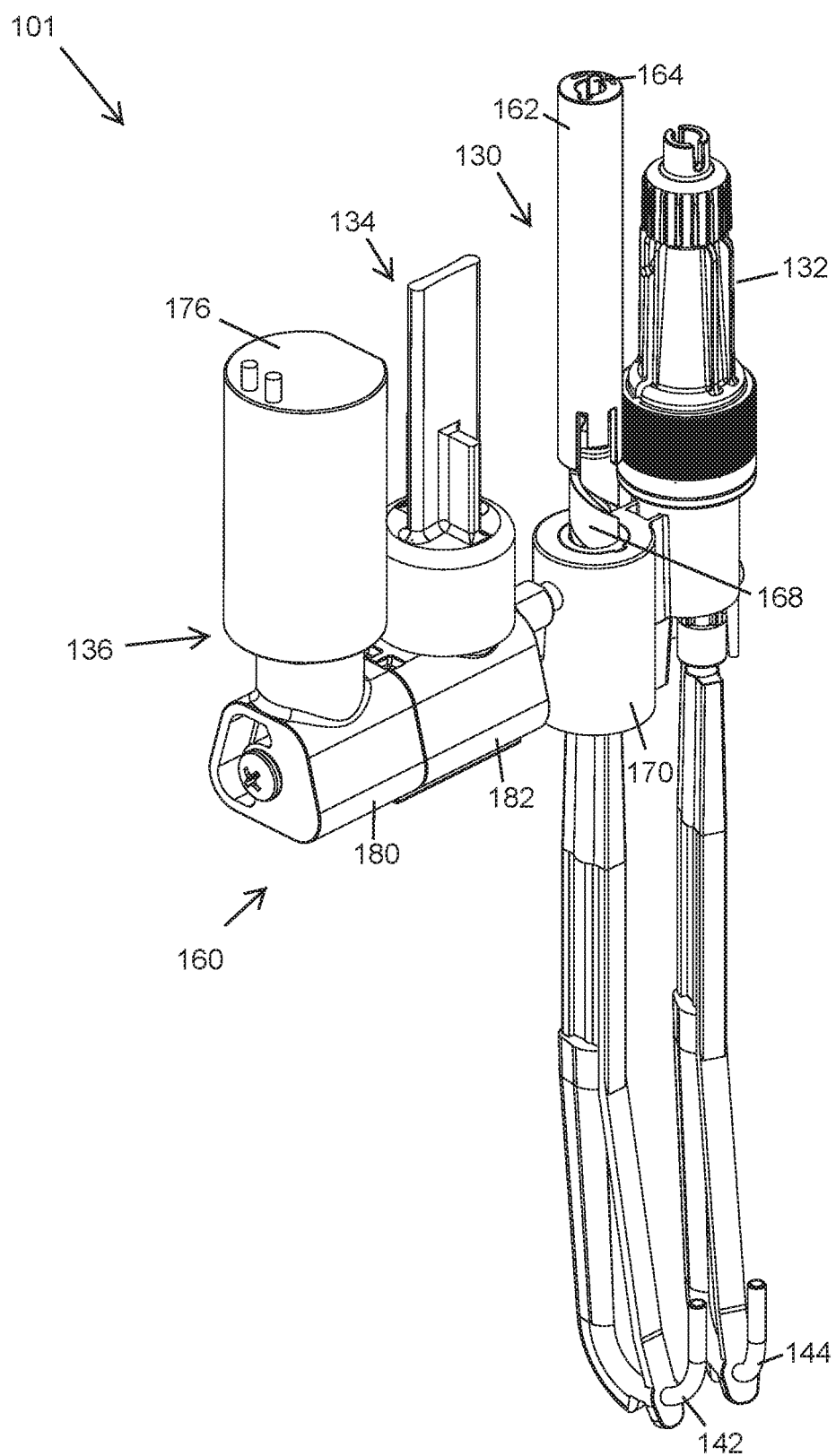
FIG. 9 illustrates modular inlet valve actuator components.
Figure 10:
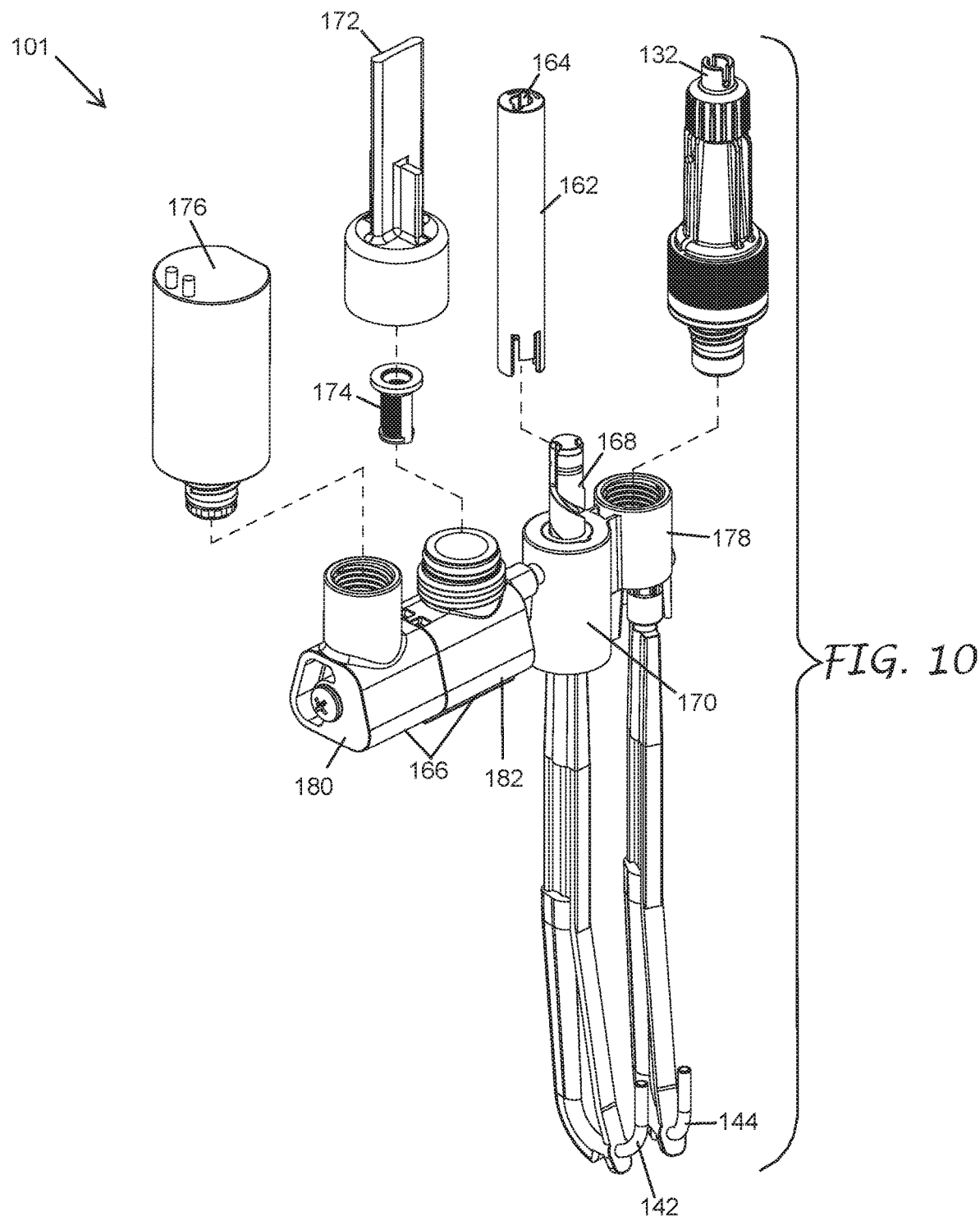
FIG. 10 is an exploded view of the inlet valve actuator components of FIG. 9.

FIGS. 9 and 10 illustrate embodiments of inlet valve actuator components. As illustrated, the inlet valve actuator assembly 101 can include a service valve 130. The service valve 130 can be connected to the inlet valve 140 via the communication line 142, as described above. The service valve 130 can be connected to a solenoid assembly 160. The solenoid assembly 160 can include a solenoid operated pilot valve 136. In some embodiments, the solenoid assembly includes a filter 134. In the illustrated embodiments, the assembly 101 includes a pressure regulator 132 connected to the service valve 130.

As illustrated in FIG. 10, the service valve 130 can include an actuator 162. The actuator 162 can include a user interface 164 configured to enable a user to manually adjust the actuator 162. For example, the user interface 164 can comprise indentations and/or protrusions configured to be engaged by a hand tool (e.g., a screwdriver, wrench, or custom hand tool). In some embodiments, the user interface 164 of the actuator 162 is accessible from outside of the sprinkler housing 104 via, for example, an access aperture 122 (FIG. 5). In some embodiments, the actuator 162 is connected to a service valve piston 168. In some embodiments, the actuator 162 is formed integrally with the service valve piston 168. The service valve piston 168, as described in more detail below, can be configured to move between a plurality of valve positions to adjust fluid flow through the inlet valve actuator assembly 101. The service valve piston 168 can be housed at least partially within a service valve housing 170.

In some embodiments, the filter 134 and solenoid operated pilot valve 136 are both connected to the same solenoid module base 166. In some embodiments, the filter 134 may be positioned downstream of the service valve 130. As illustrated, the filter 134 can include a filter cover 172. The filter cover 172 can be removable from the base 166. Removal of the filter cover 172 from the base 166 can allow a user to clean, service, repair, or replace the filter screen 174 inside the filter 134. In some embodiments, the filter cover 172 is connected to the base 166 via threading, friction fit, detent fittings, clips, and/or some other releasable connection structure. In some embodiments, the pilot valve solenoid 176 is removable from the base 166 to allow for replacement or repair of the solenoid without removing the entire assembly 101 or base 166. Similarly, the pressure regulator 132 may be removable from the regulator housing 178 to allow for repair or replacement of the regulator valve component.

Figure 11:
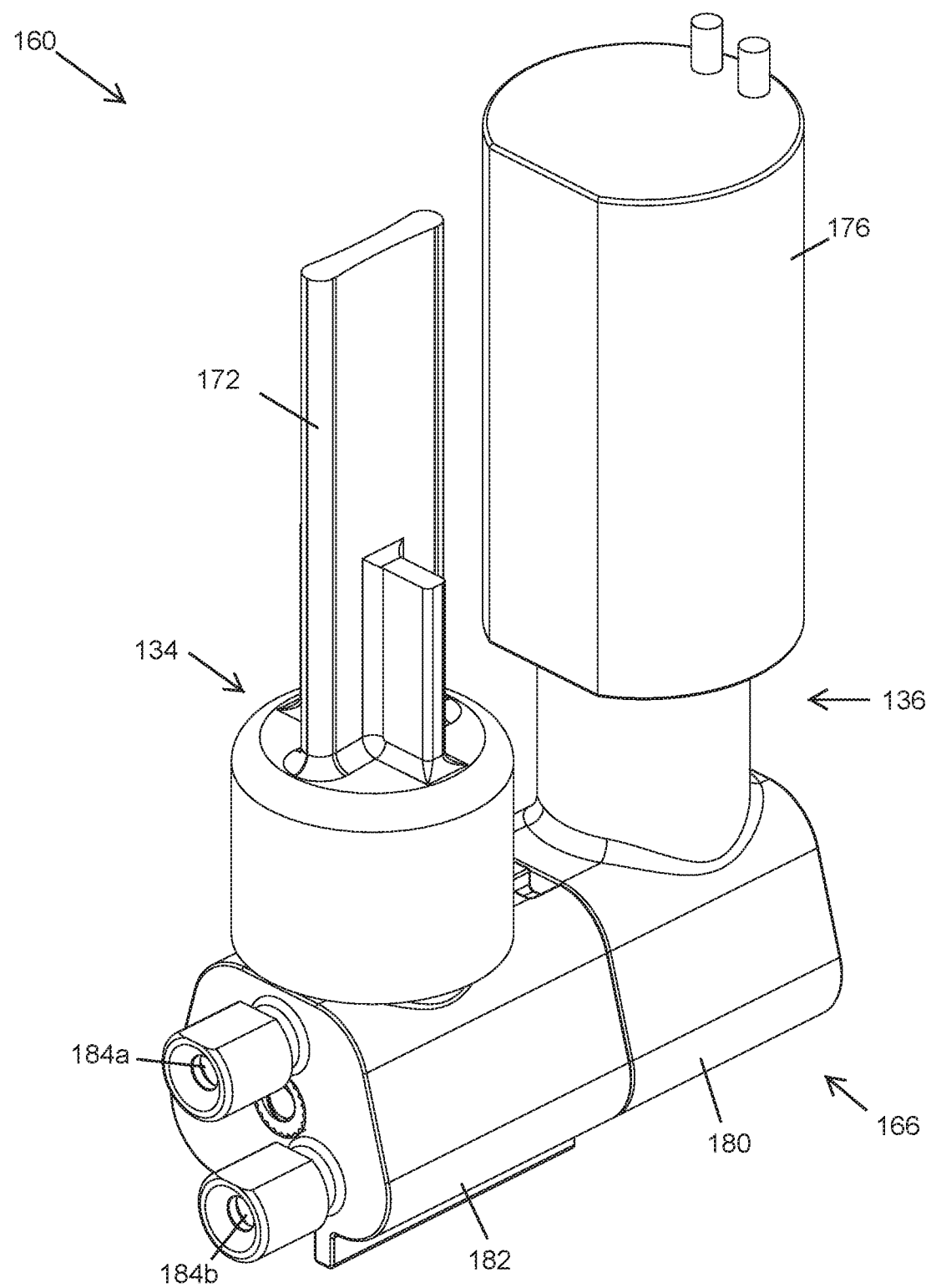
FIG. 11 illustrates a solenoid actuator module.
Figure 12:
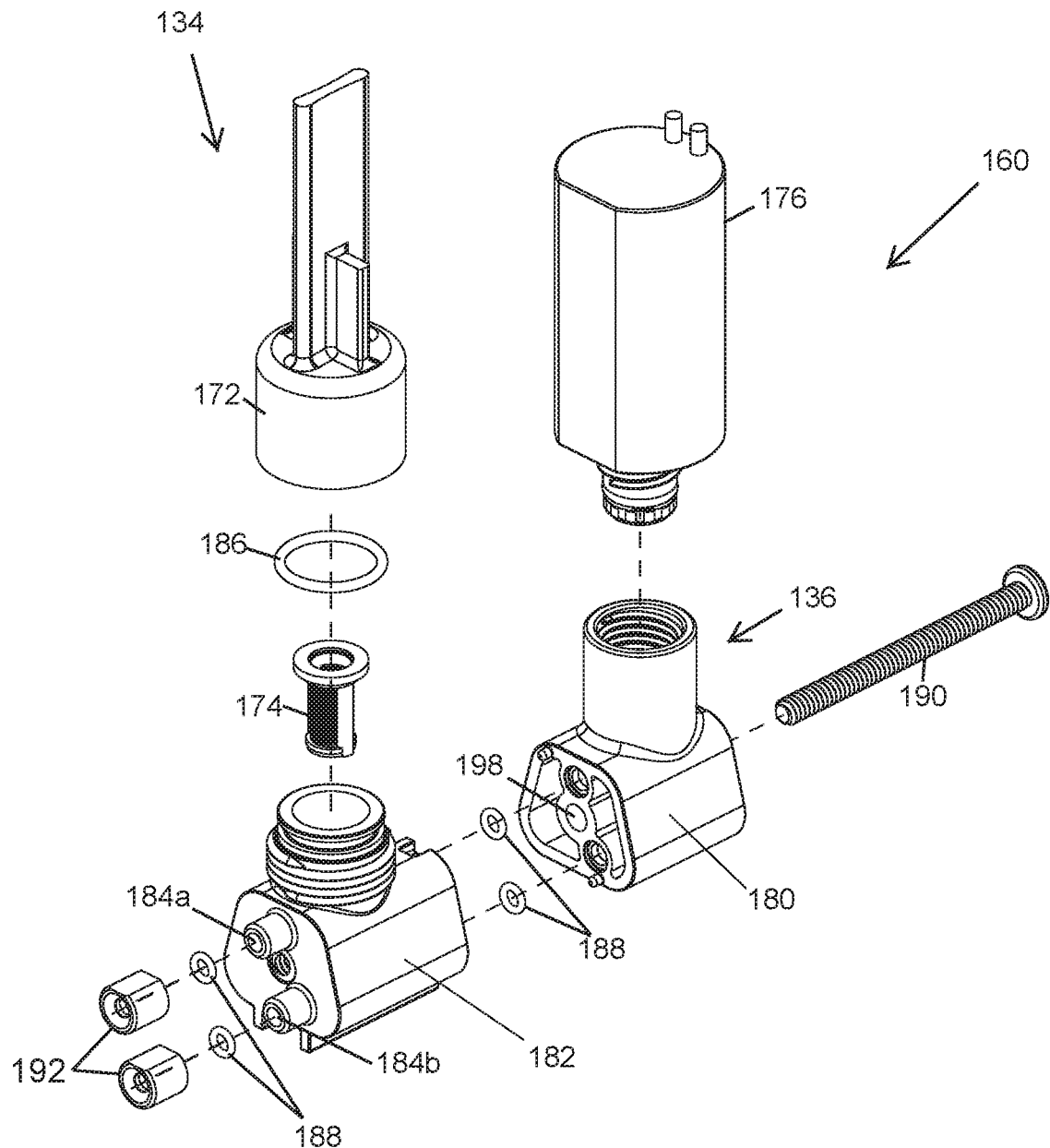
FIG. 12 is an exploded view of the solenoid actuator module of FIG. 11.

As illustrated in FIGS. 11 and 12, the solenoid base 166 may comprise a plurality of base portions. For example, the solenoid base 166 can include a solenoid valve base 180 configured to connect to a filter base 182. The solenoid base 166 can include one or more fluid lines. For example, the solenoid base 166 can includes a first fluid line 184a. The first fluid line 184a can pass through the filter base 182 and into the solenoid valve base 180. A second fluid line 184b can extend from the first fluid line 184a in the solenoid valve base 180 and through the filter base 182. The first and second fluid lines 184a, 184b can be separate from each other in the filter base 182. In some embodiments, the solenoid valve base 180 is connected to the filter base 182 via one or more fasteners 190, bayonet fittings, threaded fittings, and/or friction fittings. As illustrated, a screw 190 may be inserted through the bases 180, 182 connect them to each other. One or both of the bases 180, 182 can include a mating aperture 198 through which the screw 190 can pass. All or a portion of the mating aperture 198 can have internal threads configured to engage with external threads of the screw 190. In some embodiments, the mating aperture is positioned between the fluid lines 184a, 184b.

The filter 134 can include a seal 186 (e.g., an O-ring) configured to inhibit fluid leakage between the filter cover 172 and the filter base 182. Additional seals 188 can be used to inhibit leakage from the first and second fluid lines 184a, 184b at the interfaces between the filter base 182 and solenoid valve base 180 and between the filter base and the service valve 130. In some embodiments, the filter 134 includes one or more seal retainers 192 configured to maintain the seals 188 within the seal retainers 192 and to seal about the ports of the fluid lines 184a, 184b, in the service valve body 130 when the service valve body 130 is attached to the filter body 182.

Figure 13:
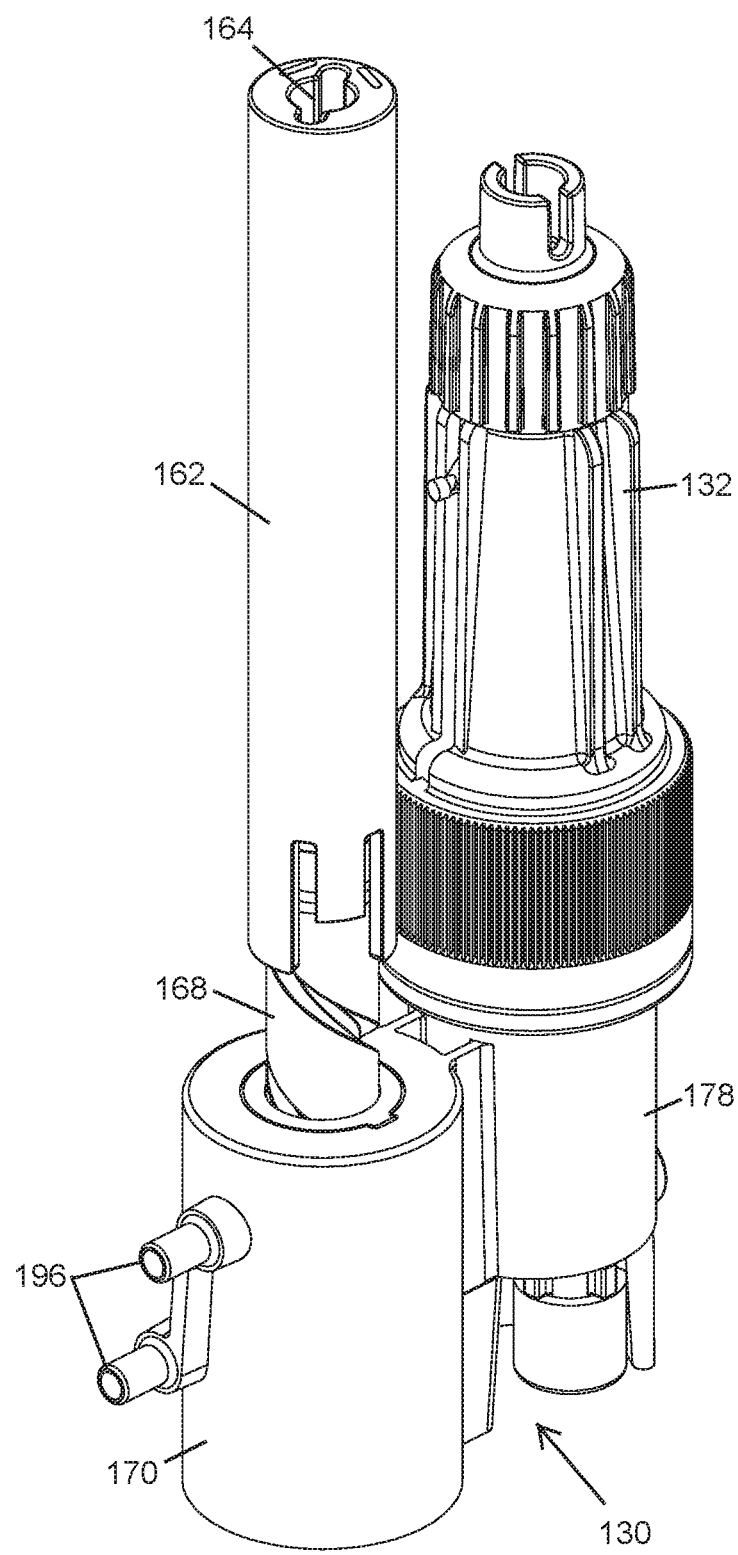
FIG. 13 illustrates a service valve module.
Figure 14:
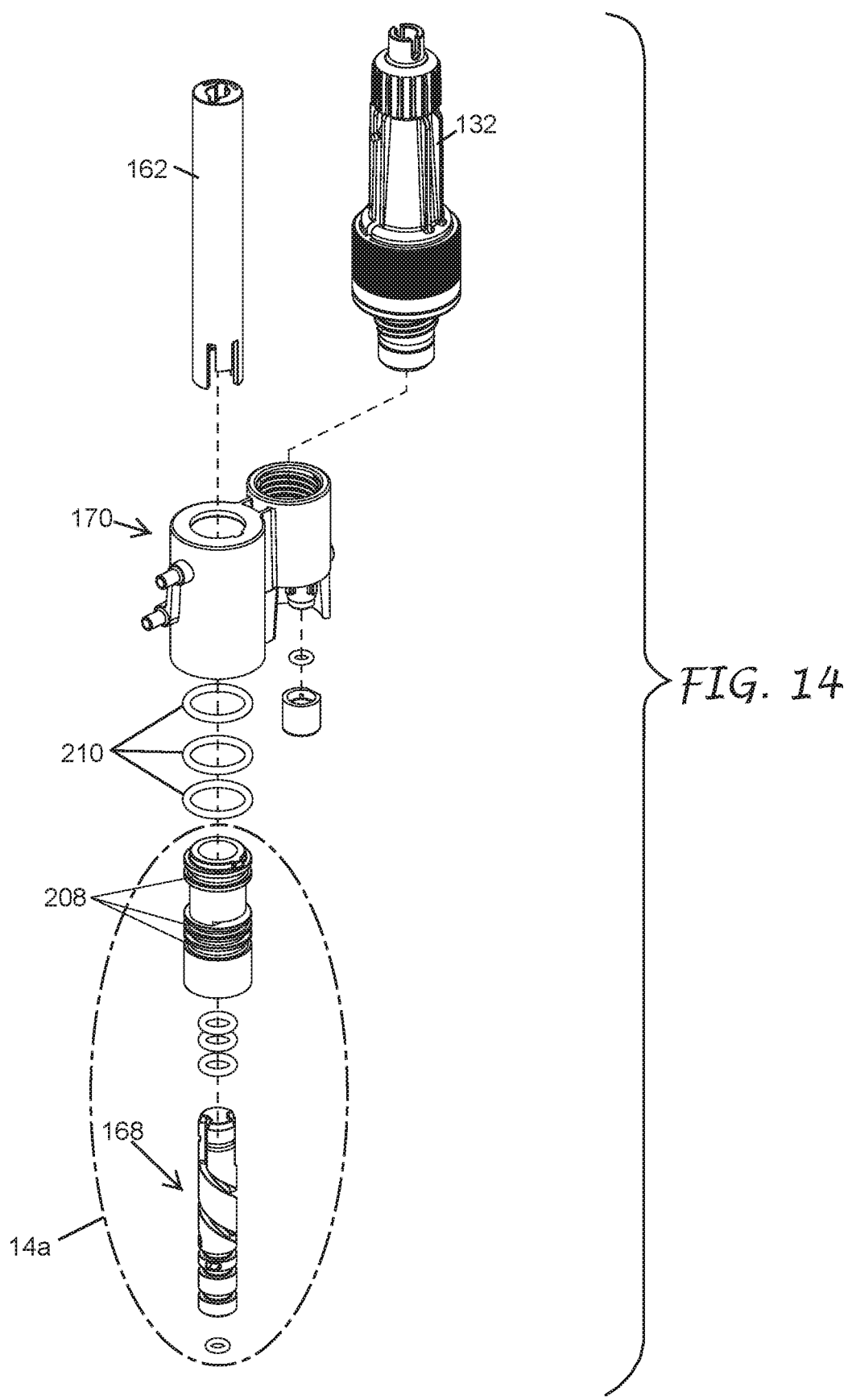
FIG. 14 is an exploded view of the service valve module of FIG. 13.

As illustrated in FIGS. 13 and 14, the service valve housing 170 can be connected the pressure regulator housing 178. In some embodiments, the service valve housing 170 is formed integrally with the pressure regulator housing 178. In some embodiments, the service valve housing 170 is separable from the pressure regulator housing 178.

In some embodiments, as illustrated in FIGS. 14 and 14A, the service valve piston 168 includes one or more grooves 200 configured to receives seals (e.g., O-rings) 202. The seals 202 can be configured to inhibit or prevent leakage between the service valve piston 168 and the service valve housing 170, other than the desired flow through the valve 130. In some embodiments, the service valve 130 includes a sleeve 204 configured to surround at least a portion of the service valve piston 168 and fit at least partially within the service valve housing 170. The sleeve 204 can include one or more grooves 208 configured to receive seals (e.g., O-rings) 210. The seals 210 can be configured to inhibit or prevent leakage between the sleeve 204 and the service valve housing 170 while the seals 202 inhibit or prevent leakage between the service valve piston 168 and the sleeve 204. The sleeve 204 can be fixed with respect to the service valve housing 170. In some embodiments, the sleeve 204 is axially fixed with respect to the service valve housing 170 and is permitted to rotate with respect to the service valve housing 170. In some embodiments, the service valve 130 includes one or more seals (e.g., O-rings) 212 configured to seal a connection between the service valve piston 168 and the communication line 142.

As illustrated in FIG. 14A, the valve piston 168 can include an outlet port 216. The outlet port 216 can extend through a lateral wall of the service valve piston 168. The valve piston 168 includes an inlet port 218 (FIG. 16A), which can be located on a lower end of the service valve piston 168. The inlet port 218 can be configured to mate with the communication tube 142. In some embodiments, the sleeve 204 includes one or more regions of lower diameter that extend at least partially around an outer perimeter of the sleeve 204 over at least a portion of the length of the sleeve 204. These regions of reduced diameter can form one or more communication chambers between the sleeve 204 and the service valve housing 170. In some embodiments, the sleeve 204 includes a first reduced diameter portion 220b that forms a first chamber 220 (e.g., a lower chamber) and a second reduced diameter portion 222b that forms a second chamber 222 (e.g., an upper chamber) (FIG. 16A). The sleeve 204 can include a first chamber port 220a configured to facilitate fluid communication between the outlet port 216 of the service valve piston 168 and the first chamber 220 when the outlet port 216 is aligned with the first chamber port 220*a*. In some embodiments, the first chamber 220 can also be in fluid communication with the second fluid line 184*b*. The sleeve 204 can include a second chamber port 222*a* (FIG. 18A) configured to facilitate fluid communication between the outlet port 216 and the second chamber 222 when the outlet port 216 is aligned with the second chamber port 222*a*. In some embodiments, the second chamber 222 can also be in fluid communication with the first fluid line 184*a*

Figure 15:
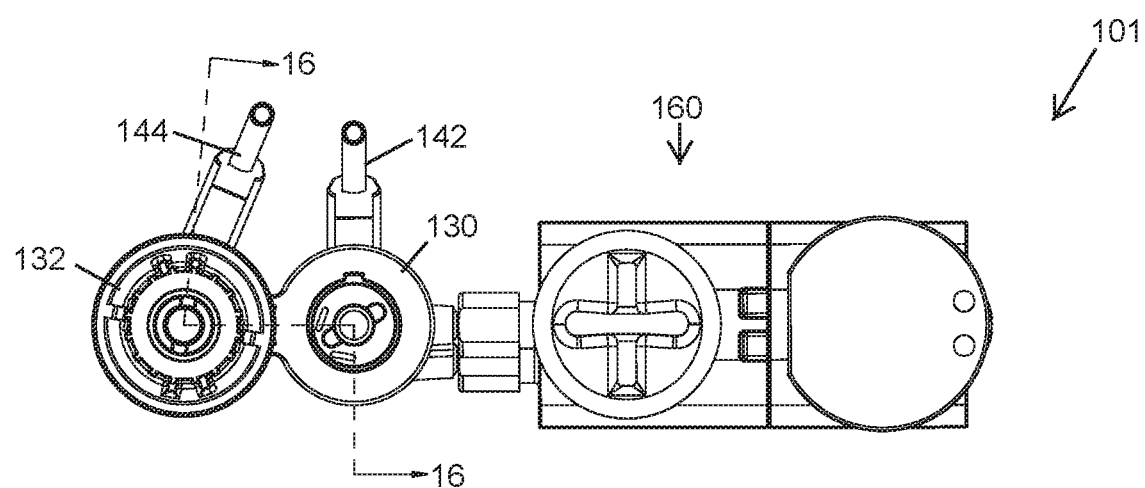
FIG. 15 illustrates a top view of the inlet valve actuator components with the service valve set to a manual ON position.
Figure 16:
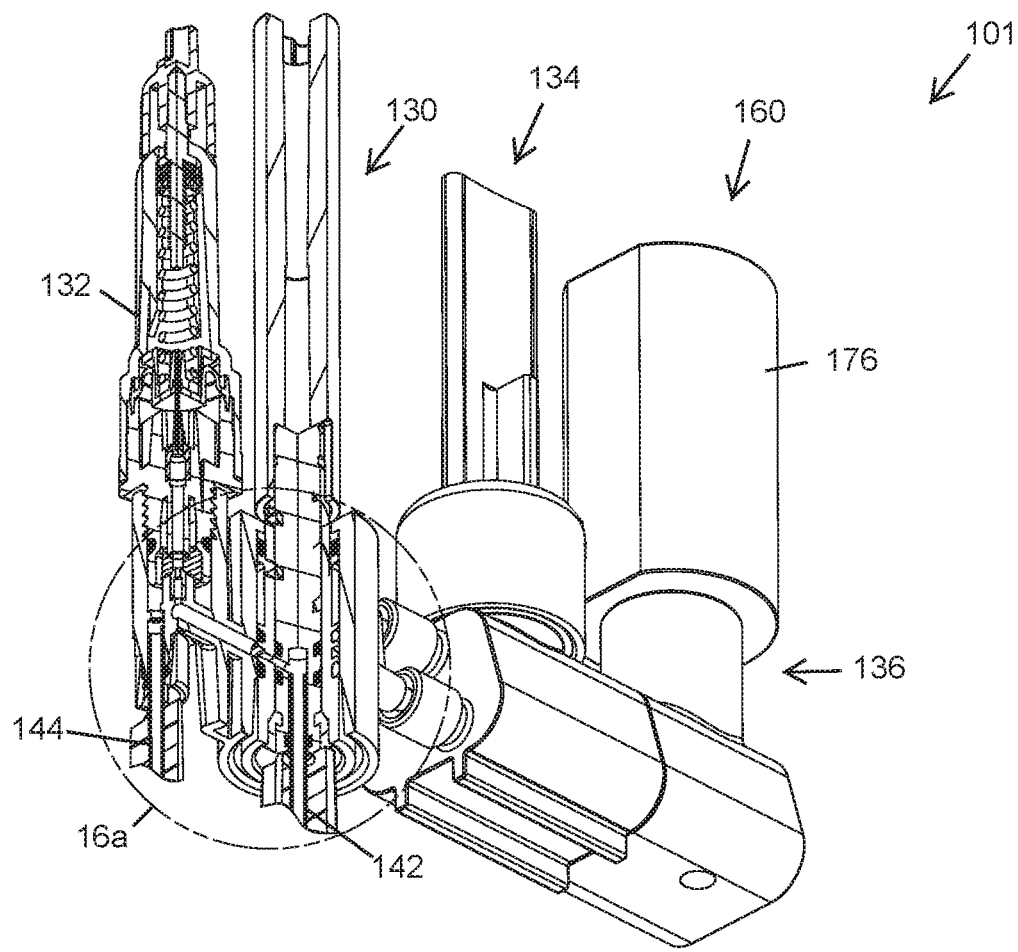
FIG. 16 is an isometric sectioned view of the inlet valve actuator components of FIG. 15.
Figure 16A:
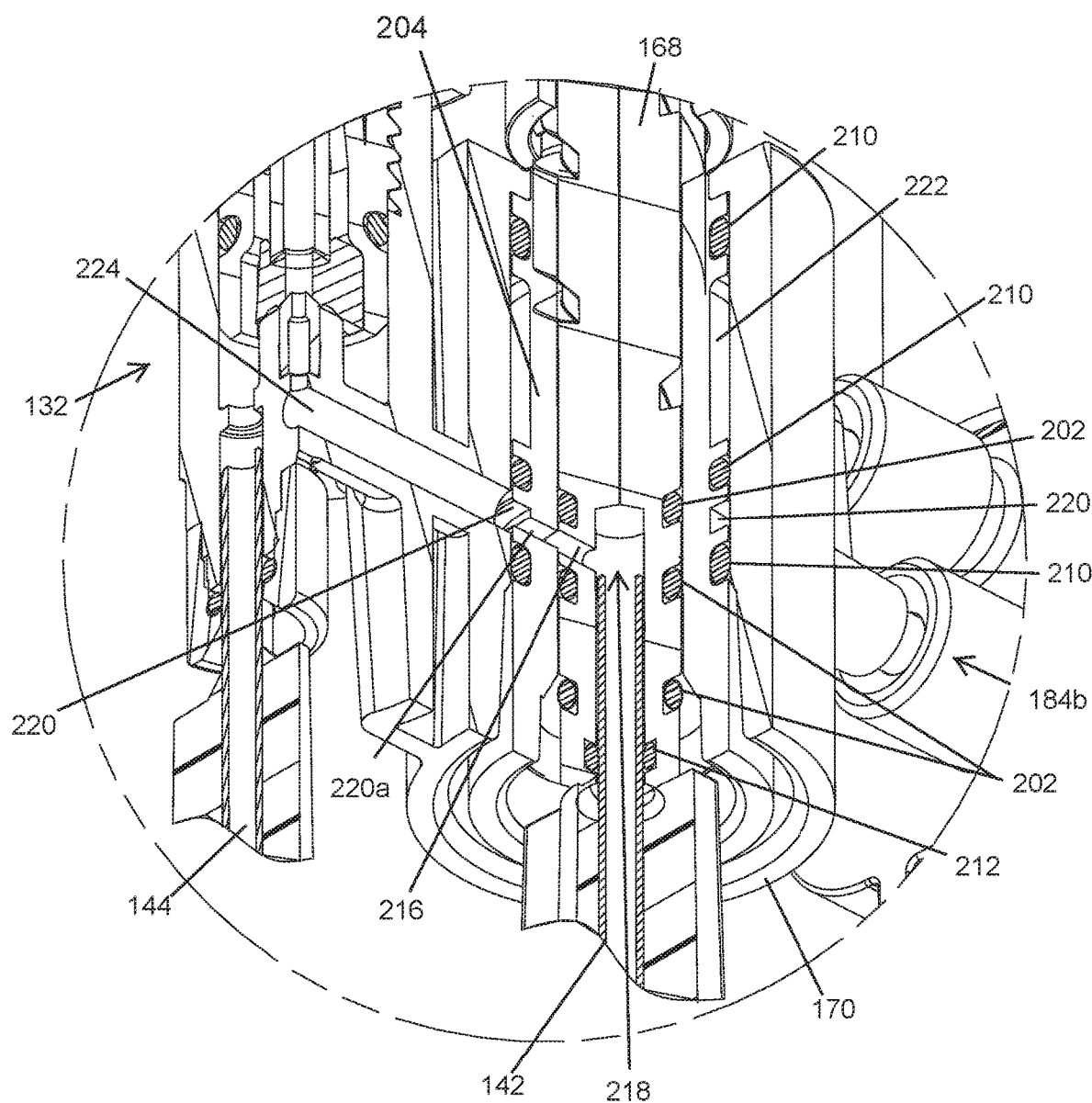
FIG. 16A is an enlarged isometric sectioned view of the detail 16a in FIG. 16.

FIGS. 15-16A illustrate the inlet valve actuator assembly 101 wherein the service valve 130 is in a first position (e.g., manual ON position). In the first position, the outlet port 216 of the valve piston 168 is aligned with the first chamber port 220*a* of the sleeve 204. The first chamber 220 can be in fluid communication with a pressure regulator inlet path 224. Water flowing through the pressure regulator inlet path 224 can pass through the pressure regulator 132 and into the vent tube 144 to vent to a position of low pressure within or outside of the riser 108. In this configuration, the inlet valve 140 is continually vented and therefore remains open. In some configurations, use of the pressure regulator 132 can facilitate metering of the pressure of the water flowing into the riser 108 via the inlet valve 140. For example, the pressure regulator 132 can restrict flow from the service valve 130 to the vent line 144 when the water pressure in the service valve 130 is below a predetermined value, thereby increasing the water pressure in the service valve 130 and upper chamber 154 of the inlet valve 140. Similarly, the pressure regulator 132 can permit increased flow from the service valve 130 to the vent line 144 when pressure within the service valve 130 is above a predetermined value, thereby reducing pressure within the service valve 130 and upper chamber 154 of the inlet valve 140. In some embodiments, the assembly 101 does not include a pressure regulator 132 and the water flowing from the first chamber 220 is directed to the vent tube 144 either directly or through an alternate flow path.

Figure 17:
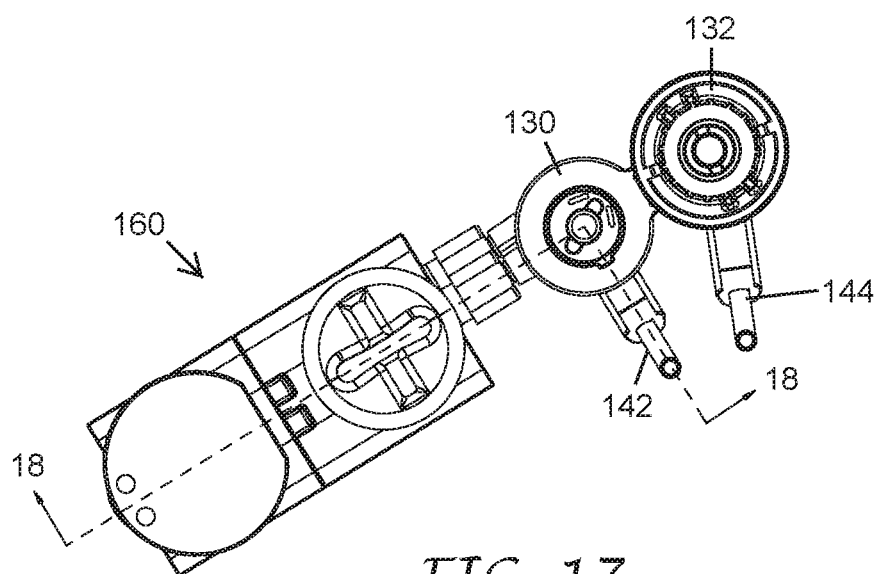
FIG. 17 illustrates a top view of the inlet valve actuator components with the service valve set to an AUTO position.
Figure 18:
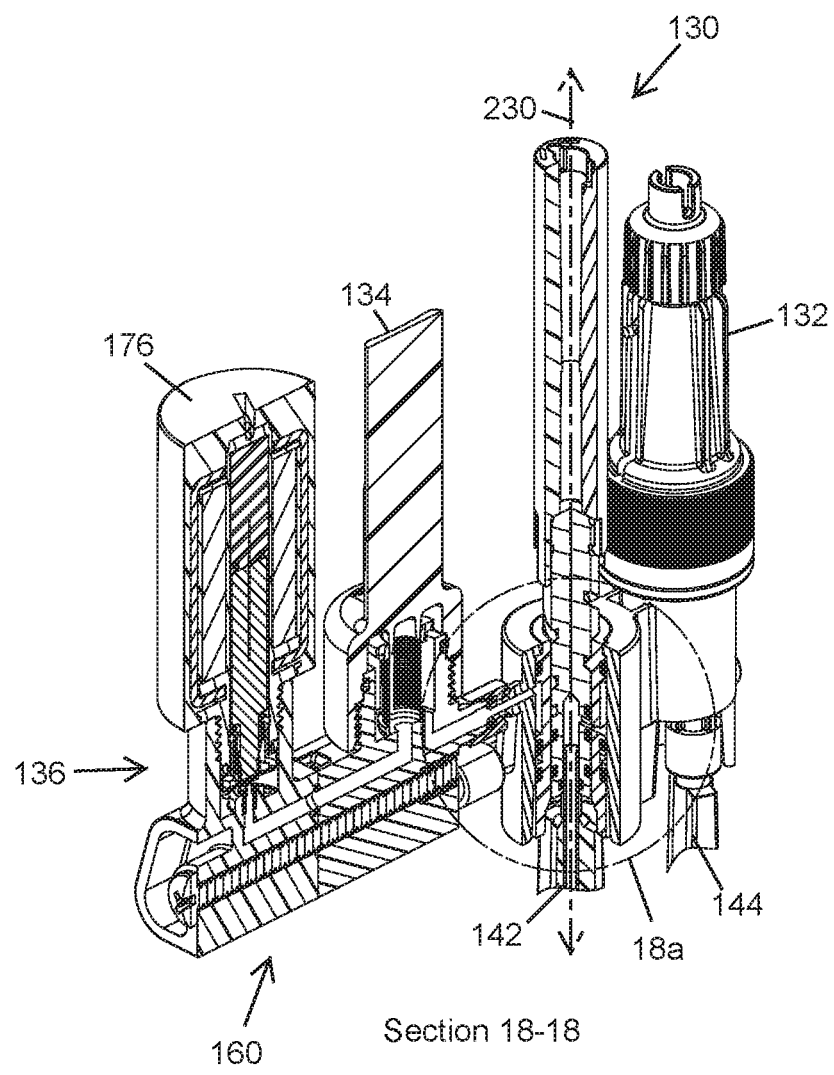
FIG. 18 is an isometric sectioned view of the inlet valve actuator components of FIG. 17.
Figure 18A:
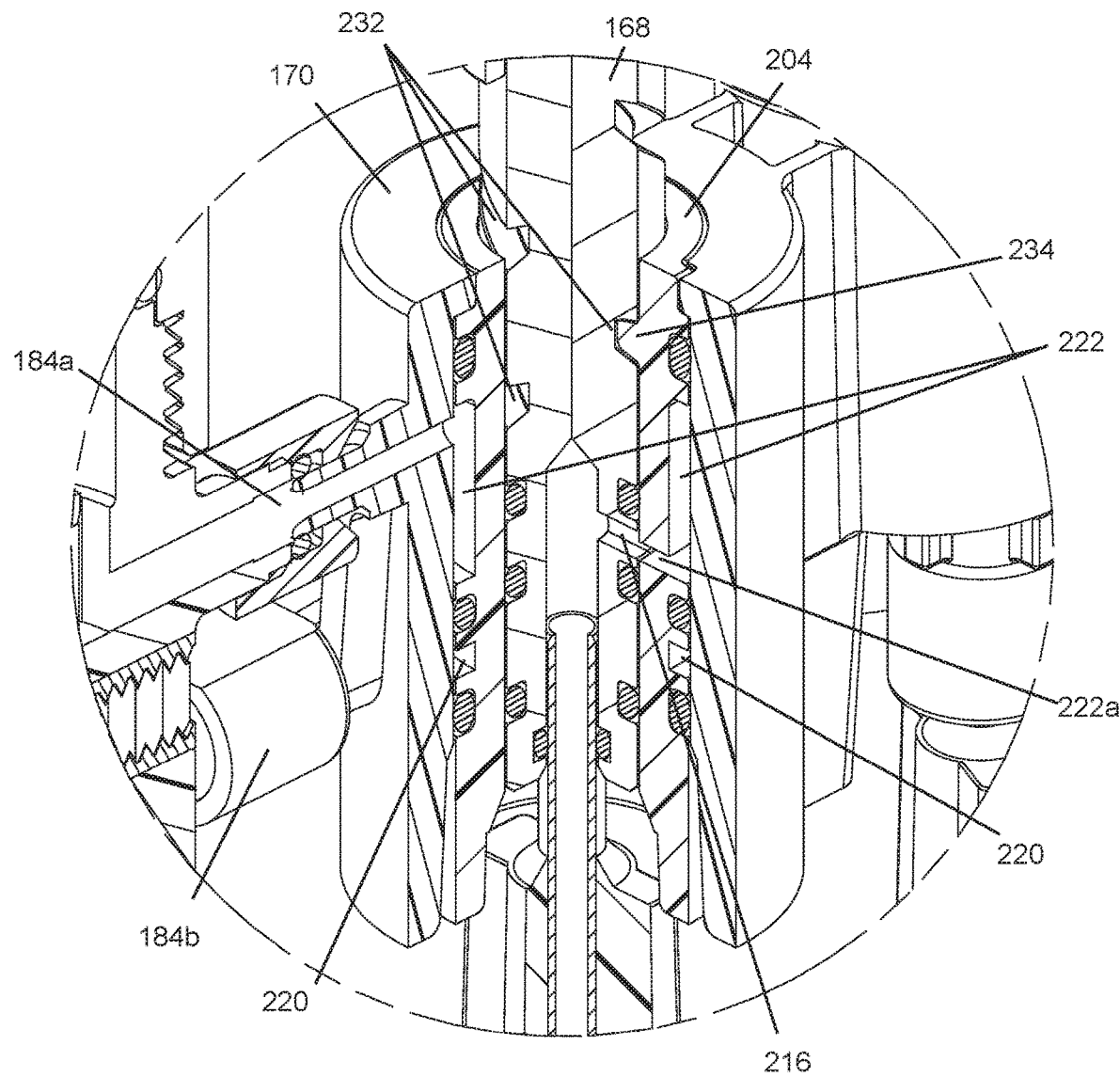
FIG. 18A is an enlarged isometric sectioned view of the detail 18a in FIG. 18.

FIGS. 17-18A illustrate the inlet valve actuator assembly 101 wherein the service valve 130 is in a second position (e.g., an AUTO position). To transition the service valve 130 to the second position from the first position, a user moves the valve piston 168 vertically (e.g., along the longitudinal axis 230 of the valve piston 168). Vertical/axial movement of the valve piston 168 can be accomplished via pulling or pushing on the valve piston 168 (e.g., pulling or pushing on the user interface 164 of the service valve 130). In some embodiments, the service valve piston 168 includes exterior threads 232 (e.g., outwardly and/or inwardly extending threads on the outer surface of the service valve piston 168), as illustrated in FIG. 14. As best illustrated in FIG. 18A, the sleeve 204 can include internal threads or tabs 234 (e.g., threads extending outwardly and/or inwardly from the inner surface of the sleeve 204), projections, or grooves configured to engage with the threads 232 of the service valve piston 168. In some embodiments, the service valve 130 does not include a sleeve 204. In some such embodiments, the valve housing 170 includes internal threads, projections, or grooves configured to engage with the threads 232 of the service valve piston 168. In some embodiments, the service valve piston 168 has external threads or tabs that interact with helical grooves formed in the sleeve 204 or the valve housing 170. When a user rotates the valve piston 168, the tabs on the valve piston 168 follow the grooves formed in the sleeve 204 or the valve housing 170 and cause the valve piston 168 to move axially as it is rotated. As illustrated, rotation of the service valve piston 168 moves the service valve 168 vertically within the valve housing 170. In some embodiments, upward movement (e.g., in the frame of reference of FIG. 18A) of the service valve piston 168 brings the outlet port 216 of the service valve piston 168 into fluid communication with the second valve chamber 222 (e.g., via the second chamber port 222*a*). As illustrated in FIG. 18A, the second valve chamber 222 can at least partially surround the service valve piston 168 to facilitate fluid communication between the outlet port 216 of the service valve piston 168 and the first fluid line 184*a* of the solenoid assembly 160. Water flowing through the first fluid line 184*a* can pass through the filter 134 (e.g., through the filter screen 174, through the solenoid operated pilot valve 136, through the second fluid line 184*b*, and back to the vent line 144 (e.g., via the first chamber 220 and in communication with the pressure regulator 132, if present). In such a configuration, the inlet valve actuator assembly 101 can operate in an AUTO mode wherein flow of water between the inlet valve 140 and the vent line 144 is controlled by a controller that selectively opens and closes the solenoid operated pilot valve 136.

Figure 19:
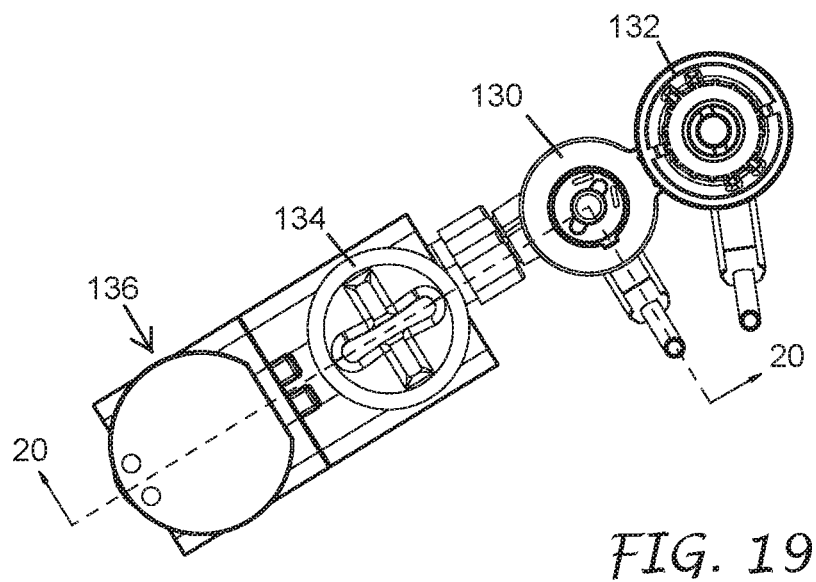
FIG. 19 illustrates a top view of the inlet valve actuator components with the service valve set to an OFF position.
Figure 20:
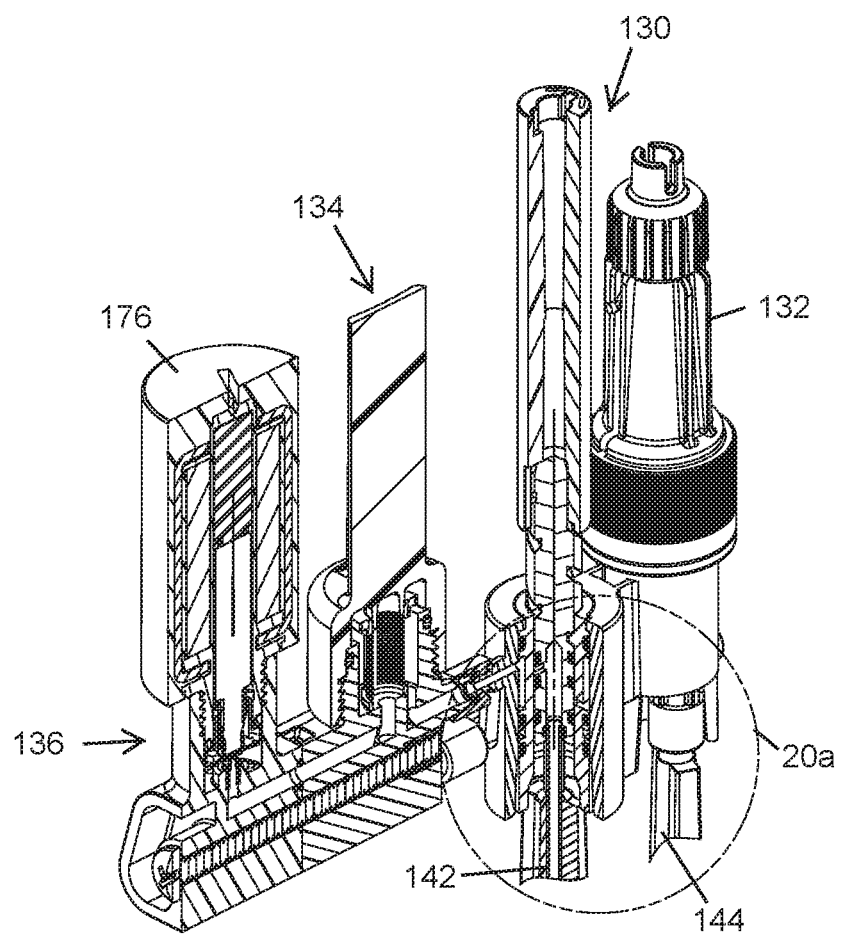
FIG. 20 is an isometric sectioned view of the inlet valve actuator components of FIG. 19.
Figure 20A:
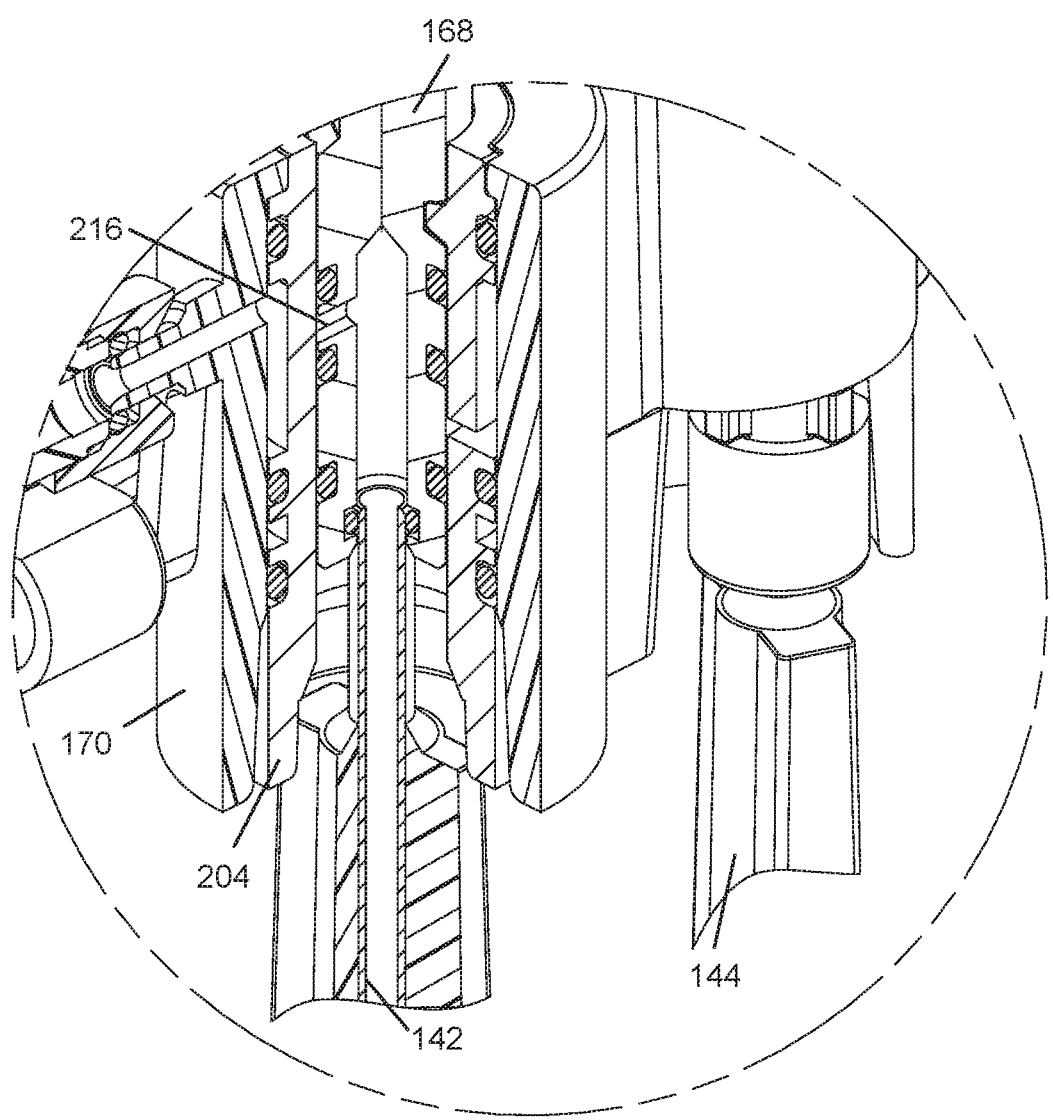
FIG. 20A is an enlarged isometric sectioned view of the detail 20a in FIG. 20.

FIGS. 19-20A illustrate the inlet valve actuator assembly 101 wherein the service valve 130 is in a third position (e.g., an OFF position). To transition the service valve 130 to the third position, a user moves the valve piston 168 vertically (e.g., along the longitudinal axis 230 of the valve piston 168). In some embodiments, the valve piston 168 is moved upward from the second position to reach the third position. In some embodiments, the valve piston 168 is moved downward from the second position to reach the third position. As illustrated in FIG. 20A, the outlet port 216 of the service valve piston 168 is sealed against the inner surface of the sleeve 204 (or the inner surface of the valve housing 170 if no sleeve is included). As such, the inlet valve 140 is cut off from the vent line 144 and therefore remains closed. Positioning of the service valve piston 168 in the third position can facilitate repair or replacement of one or more components of the sprinkler 100 without requiring depressurization of a broader portion of the irrigation system.

FIGS. 21-27 illustrate embodiments of sprinklers and inlet valve actuator assemblies that are similar in many respects to the sprinklers and inlet valve actuators described above with respect to FIGS. 1-20A. Reference numbers used in FIGS. 21-27 to label components having the same or similar structure and/or function to components disclosed in FIGS. 1-20A are the same as those reference numbers used in FIGS. 1-20A, with an added value of 300. For example, the pressure regulator 323 identified in FIGS. 21-23 can be the same or similar in structure and/or function as the pressure regulator 23 identified in FIGS. 2-4. Similarly, the inlet valve 440 illustrated in FIG. 25 can be the same or similar in structure and/or function as the inlet vale 140 illustrated in FIGS. 8A-8B. Unless otherwise described below, the components illustrated in FIGS. 21-27 can include same or similar structure and/or function as the like components in FIGS. 1-20A.

Figures 21, 22, 23:
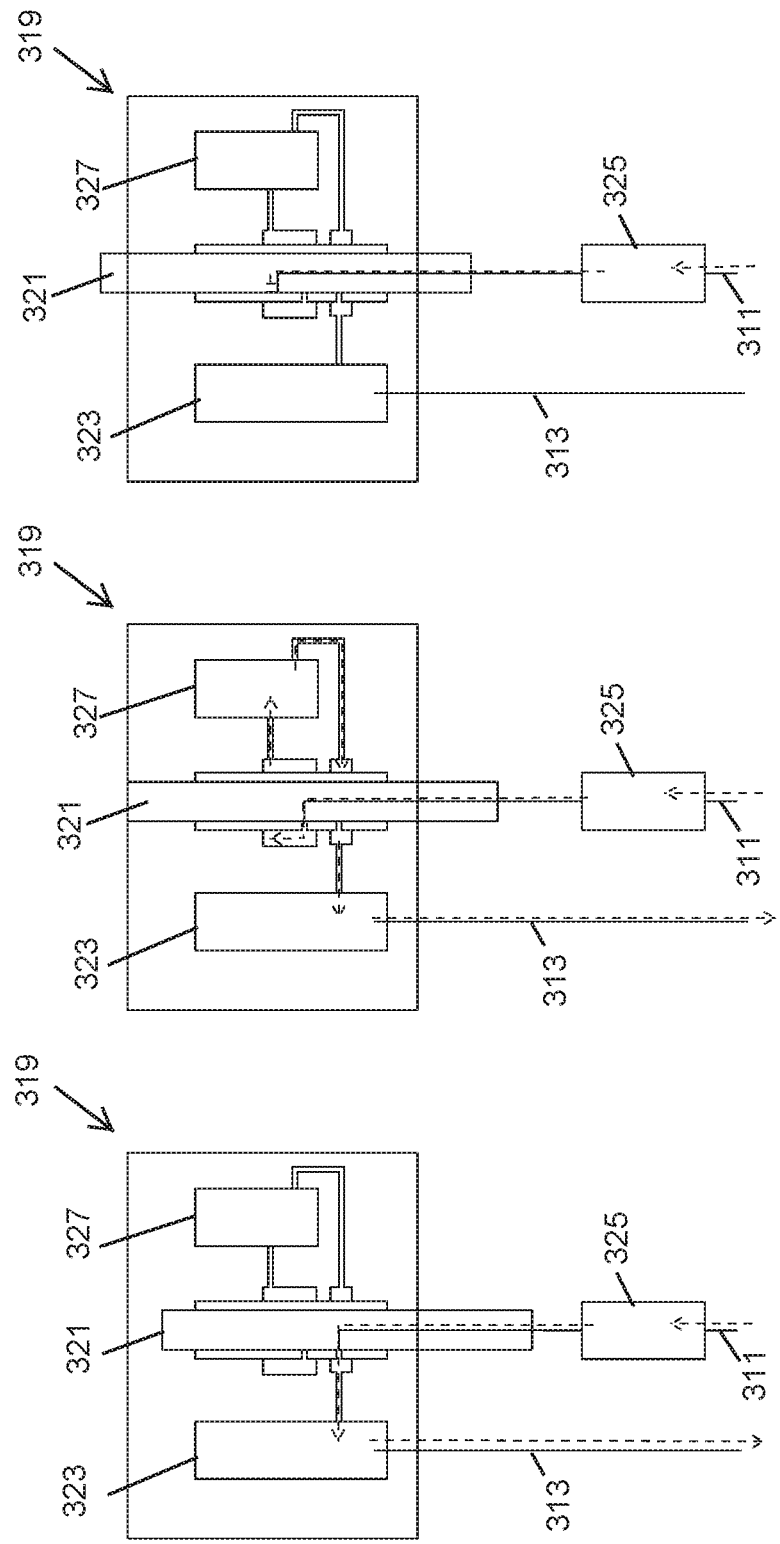
FIG. 21 is a schematic illustration of another embodiment of an inlet valve control system attached to the irrigation sprinkler of FIG. 1 in the ON position.
FIG. 22 is a schematic illustration of the inlet valve control system of FIG. 21 attached to the irrigation sprinkler of FIG. 1 in the AUTO position.
FIG. 23 is a schematic illustration of the inlet valve control system of FIG. 21 attached to the irrigation sprinkler of FIG. 1 in the OFF position.

As illustrated in FIGS. 21-23, the filter 325 can be positioned upstream of the service valve 321. Positioning the filter 325 upstream of the service valve 321 can reduce the likelihood that particulates or other undesirable materials are introduced to the service valve 321, pressure regulator 323, and/or solenoid pilot valve 327. In other respects, the inlet valve actuation components illustrated in FIGS. 21-23 can operate in a manner substantially the same as that described with respect to FIGS. 2-4A. Namely, in the ON configuration, as illustrated in FIG. 21, the service valve 321 passes water from the communication line 311 to the vent line 313 either directly or via the pressure regulator 323 when present. In the AUTO configuration, as illustrated in FIG. 22, the service valve 321 directs water from the communication line 311 to the solenoid pilot valve 327 which, in turn, selectively facilitates water transfer to the vent line 313 either directly or via the pressure regulator 323, when present. Finally, in the OFF configuration illustrated in FIG. 23, the service valve 321 cuts off fluid communication between the communication line 311 and the vent line 313.

Figure 24:
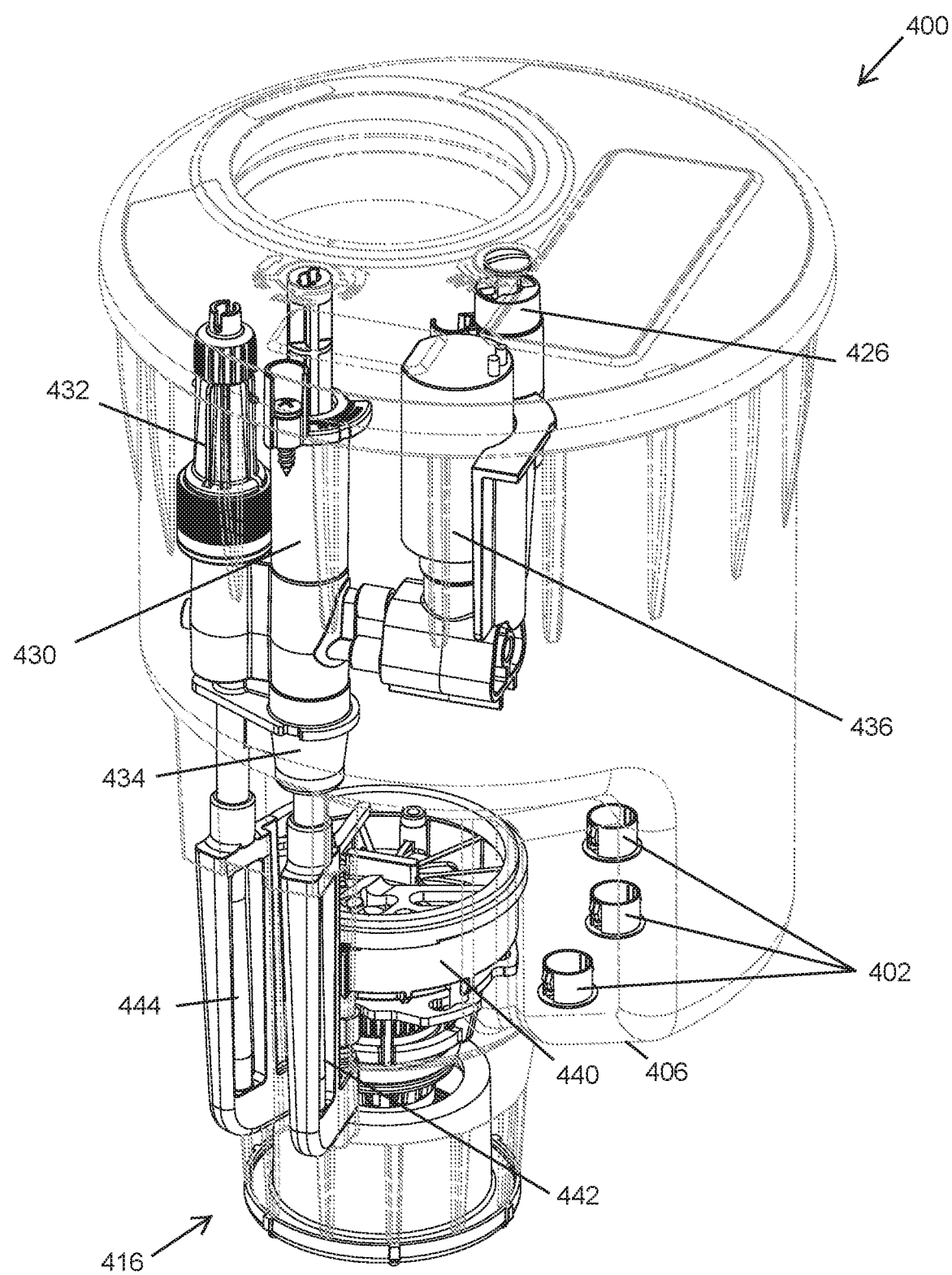
FIG. 24 illustrates another embodiment of an outer case and ground support flange of a sprinkler that utilizes a 3-way service valve.
Figure 25:
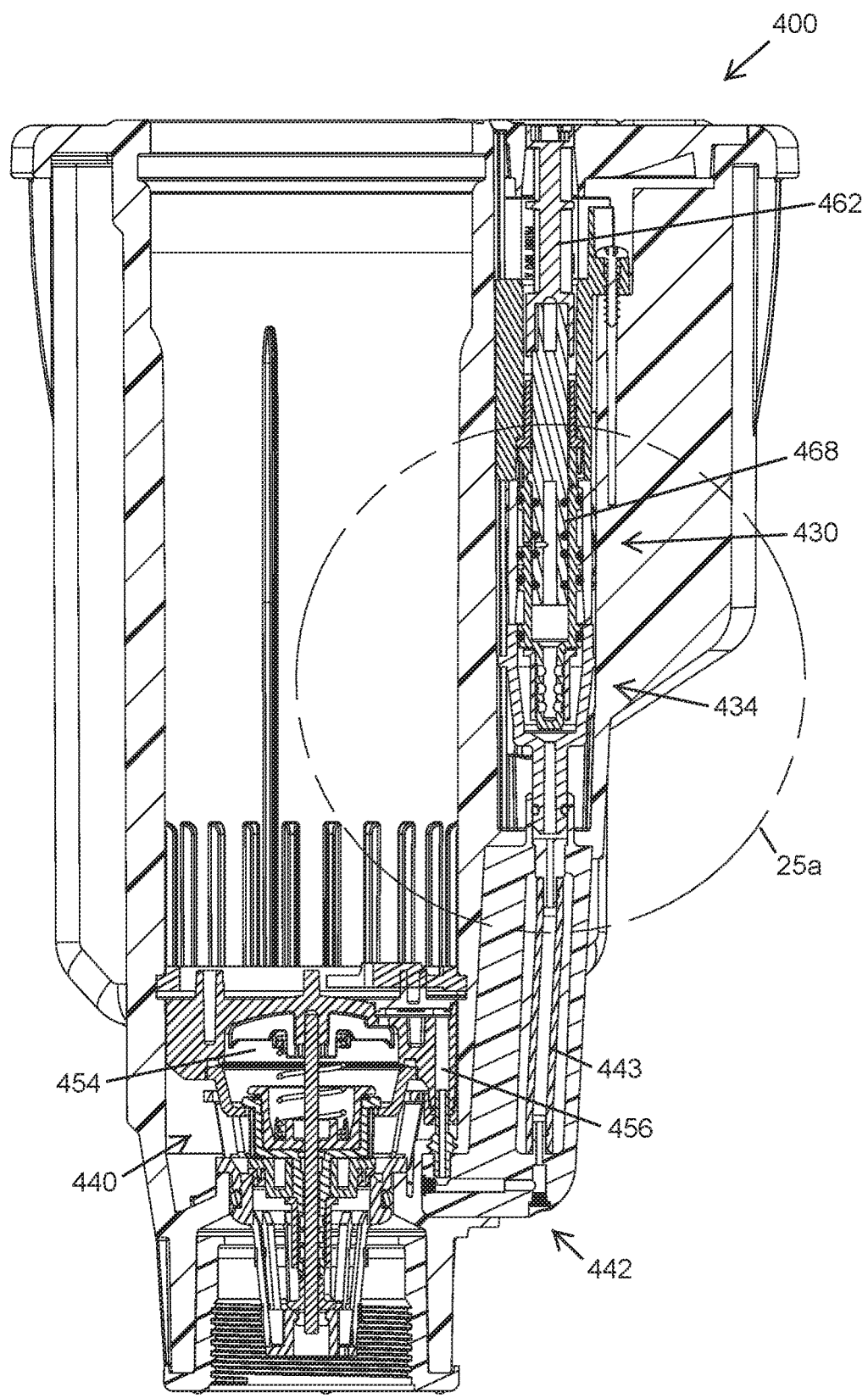
FIG. 25 is a sectioned view of the top serviceable sprinkler of FIG. 24.
Figure 25A:
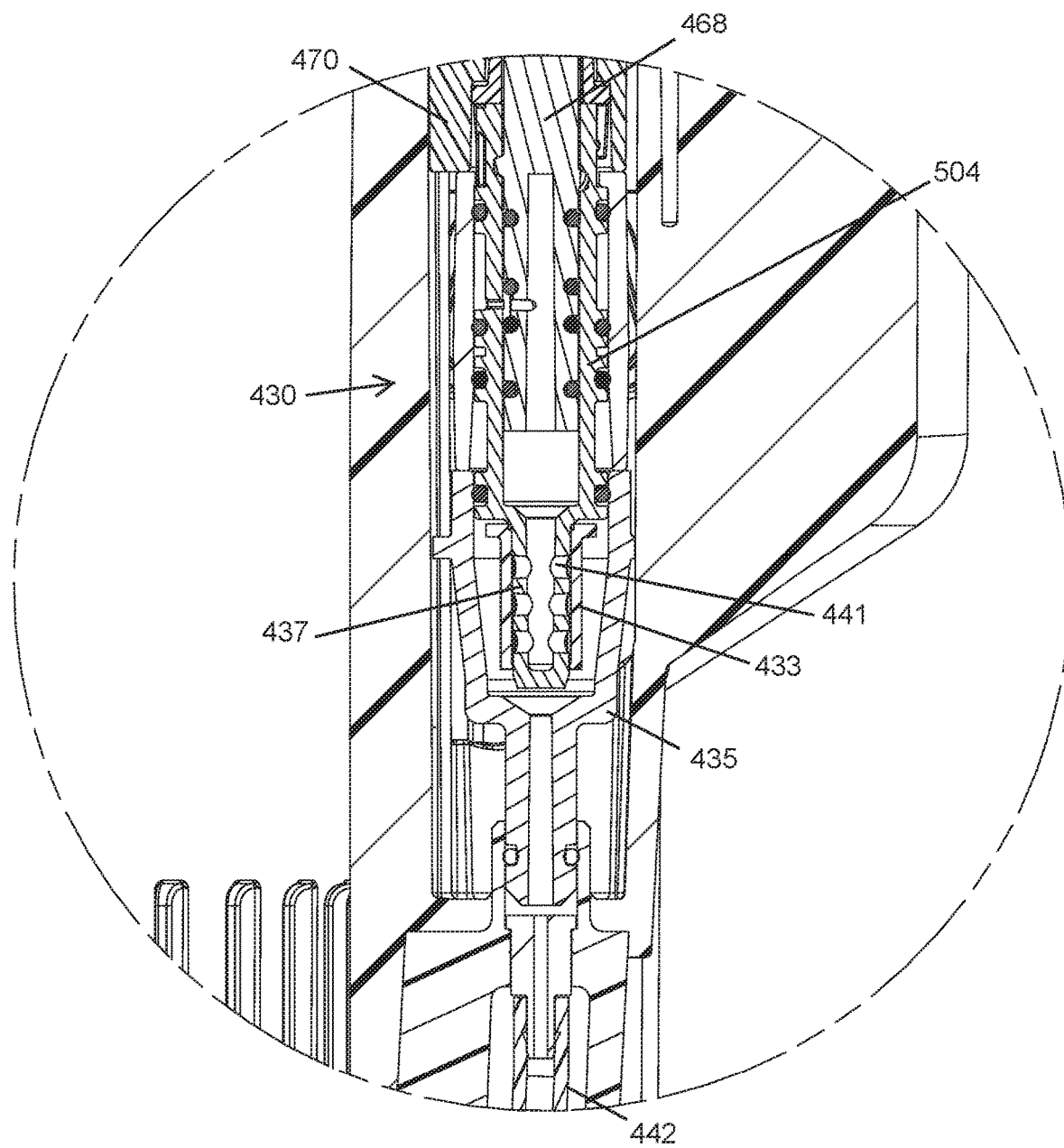
FIG. 25A is an enlarged view of the detail 25a in FIG. 25.
Figure 26:
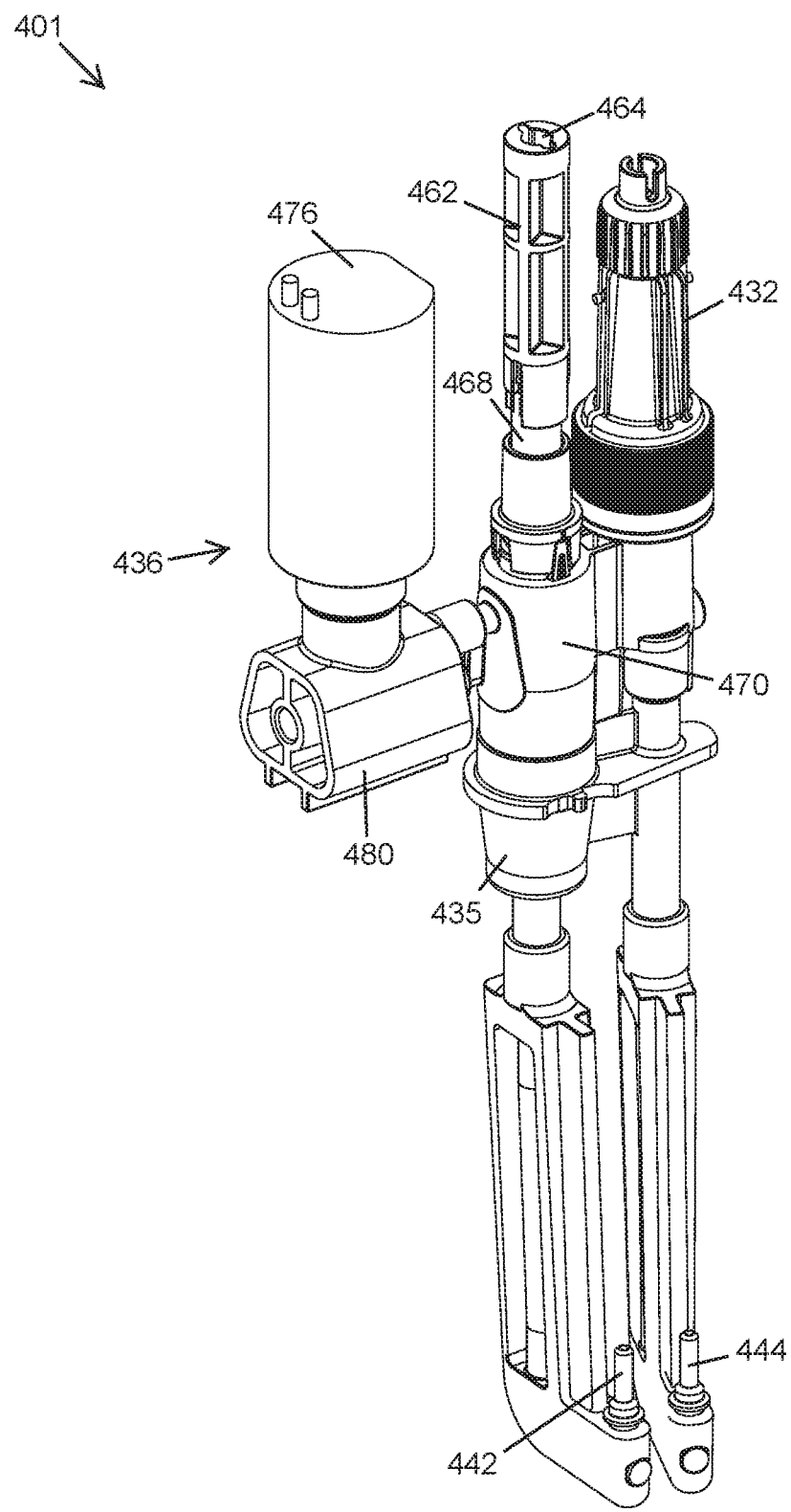
FIG. 26 illustrates another embodiment of modular inlet valve actuator components.

As illustrated in FIGS. 24-26, the filter 434 can be positioned upstream of the service valve 430. In some embodiments, the filter 434 is positioned collinear with the service valve 430. In the illustrated embodiments of FIGS. 24-26, the filter 434 is positioned below the service valve 430, between the service valve 430 and the communication line 442.

Referring to FIGS. 25A-27, the filter 434 can include a filter screen 433. The filter screen 433 can be positioned at least partially within a filter housing 435. The filter screen 433 can be positioned around a filter post 437 or some other structure. As illustrated, the filter post 439 can include one or more apertures 441 through which filtered water can enter the filter post 439 (e.g., and enter the service valve 430). In some embodiments, the filter screen 433 is connected to some portion of the service valve 430. For example, the filter screen 433 can be connected to the sleeve 504 of the service valve 430. In some embodiments, the filter screen 433 is co-molded with the sleeve 504. Preferably, all water that pass from the communications line 442 pass through the filter screen 433 before passing through the service valve 430.

As illustrated in FIG. 25, the communication line 442 can include a flexible communication tube 443. The flexible tube 443 can extend along at least a portion of the fluid communication line between the filter 434 and the access portion 456. The flexible tube 443 can be housed within a rigid structure, partially housed within a rigid structure, connected to one or more rigid structures, and/or surrounded by one or more rigid structures. In some embodiments, portions of the fluid line between the filter 434 and the access portion 456 can be constructed as rigid or semi-rigid structures. Positioning the flexible tube 443 in or near rigid or semi-rigid structures can reduce the likelihood of damage to the flexible tube 443 by shovels or other tools during installation or uninstallation of the sprinkler 400. The use of flexible tubing for all or a portion of the fluid connection between the filter 434 and the access portion 456 can reduce the manufacturing and/or material costs for the sprinkler 400.

Figure 27:
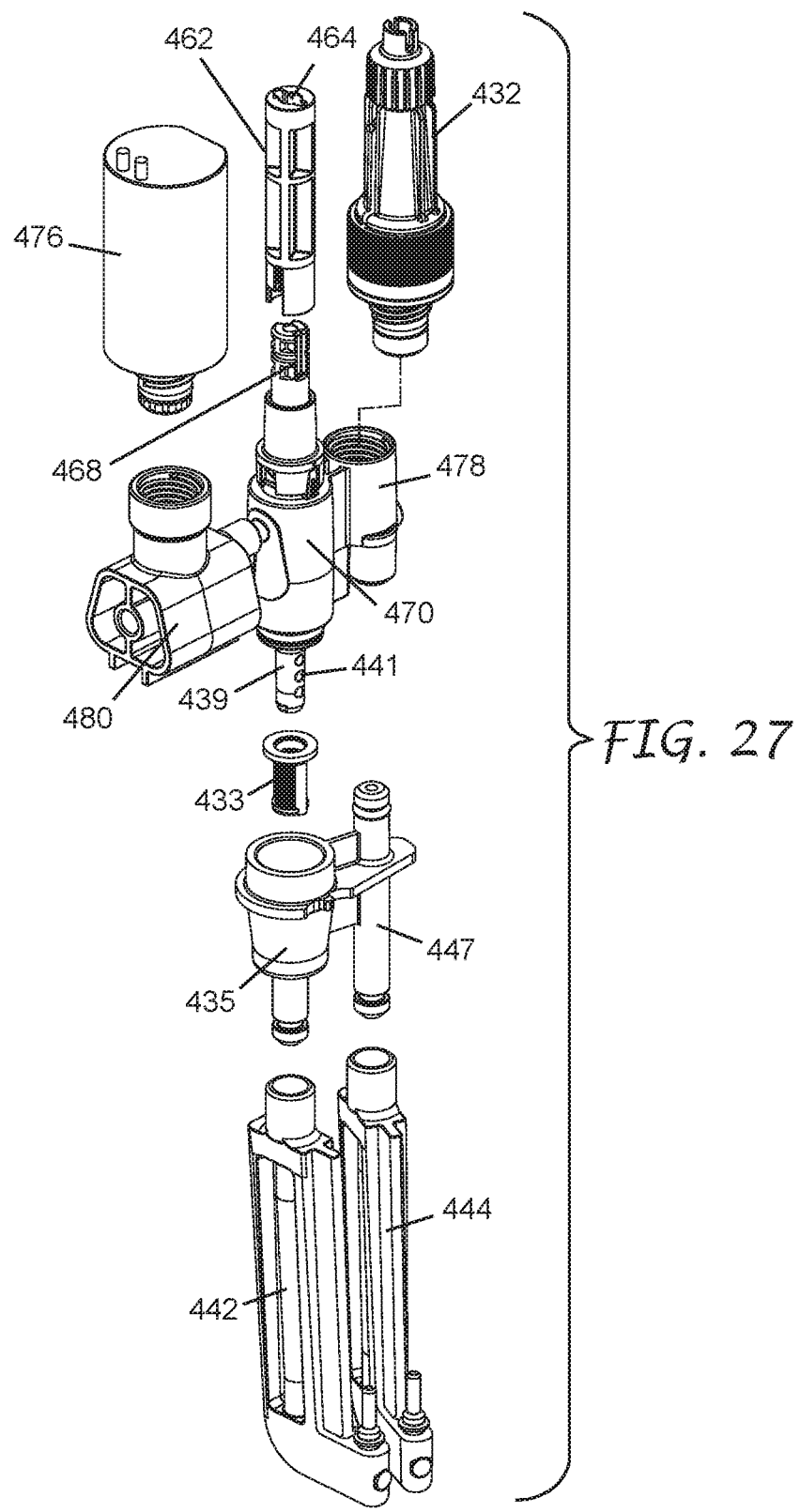
FIG. 27 is an exploded view of FIG. 26.

In some embodiments, the fluid communication line between the filter 434 and/or service valve 430 and the inlet valve 440 (e.g., the access portion 456 of the intake valve 440) is composed of at least two separate structures. For example, as illustrated in FIG. 27, the filter housing 435 can be separable from the service valve housing 470 and from an upstream portion of the communication line 442. In some embodiments, the filter housing 435 is connected to an intermediate portion 447 of the vent line 444. Forming the communication and vent fluid paths 442, 444 as modular and/or separable components can reduce the complexity of the molds required to form the fluid paths 442, 444.

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

For expository purposes, the term "horizontal" as used herein is defined as a plane parallel to the plane or surface of the floor of the area in which the device being described is used or the method being described is performed, regardless of its orientation. The term "floor" floor can be interchanged with the term "ground." The term "vertical" refers to a direction perpendicular to the horizontal as just defined. Terms such as "above," "below," "bottom," "top," "side," "higher," "lower," "upper," "over," and "under," are defined with respect to the horizontal plane.

Although the sprinkler has been disclosed in the context of certain embodiments and examples, it will be understood by those skilled in the art that the sprinkler and corresponding inlet valve actuator assembly extends beyond the specifically disclosed embodiments to other alternative embodiments and/or uses of the embodiments and certain modifications and equivalents thereof. For example, some embodiments are configured to operate with a non-rotating nozzle or with a non-retractable riser. Accordingly, it is intended that the scope of the sprinkler herein-disclosed should not be limited by the particular disclosed embodiments described above, but should be determined only by a fair reading of the claims that follow.

What is claimed is:

1. A flow control system for an irrigation sprinkler, the system comprising:
   a service valve including:
      an inlet;
      a first fluid port;
      a second fluid port; and
      a valve piston having a valve piston inlet and a valve piston outlet;
   a filter in fluid communication with the inlet of the service valve;
   a vent line in fluid communication with the first fluid port; and
   a pilot valve in fluid communication with the second fluid port;
   wherein:
      the valve piston is configured to rotate while moving vertically with respect to the first and second fluid ports between first and second valve positions;
      the valve piston is configured to permit fluid communication between the first fluid port and the valve piston inlet when the valve piston is in the first position;

the valve piston is configured to permit fluid communication between the second fluid port and the valve piston inlet when the valve piston is in the second position; and the valve piston is configured to inhibit fluid communication between the valve piston inlet and each of the first and second fluid ports when the valve piston is in a third position.

2. The flow control system of claim 1, comprising a pressure regulator in fluid communication with the first fluid port and configured to regulate pressure of fluid between the first fluid port and the vent line.

3. The flow control system of claim 1, wherein the first fluid port is in fluid communication with a third fluid port.

4. The flow control system of claim 3, wherein the service valve includes a fluid chamber at least partially surrounding a portion of the valve piston and in fluid communication with the first and third fluid ports.

5. The flow control system of claim 1, comprising a sprinkler inlet valve in fluid communication with the valve piston inlet.

6. The flow control system of claim 5, wherein the sprinkler inlet valve includes a chamber positioned on a side of a valve seat opposite a sprinkler water inlet, and wherein the chamber is in fluid communication with the valve piston inlet via a communication line.

7. The flow control system of claim 5, wherein the vent line is in fluid communication with a low pressure side of the sprinkler inlet valve.

8. The flow control system of claim 2, wherein the vent line comprises a first end and a second end, the first end connected to the pressure regulator and the second end positioned at a lower end of a sprinkler housing.

9. A flow control system for an irrigation sprinkler, the system comprising:
a service valve including:
a service valve housing having;
a first fluid port; and
a second fluid port; and
a service valve piston positioned at least partially within the service valve housing and configured to rotate while linearly reciprocating with respect to the service valve housing between first, second, and third positions, the service valve piston having a valve piston inlet and a valve piston outlet;
a filter in fluid communication with the service valve;
a pilot valve in fluid communication with the second fluid port; and
a vent line in fluid communication with the first fluid port; wherein:
the valve piston outlet is in fluid communication with the first fluid port when the service valve piston is in the first position;

the valve piston outlet is in fluid communication with the second fluid port when the service valve piston is in the second position; and the valve piston outlet is blocked when the service valve piston is in the third position.

10. The flow control system of claim 9, comprising a pressure regulator having a pressure regulator housing in fluid communication with the first fluid port.

11. The flow control system of claim 10, wherein the pressure regulator housing is formed integral with the service valve housing.

12. The flow control system of claim 9, wherein the filter is configured to filter all water passing into the service valve via the valve piston inlet.

13. The flow control system of claim 9, wherein the filter comprises a filter post and a filter screen mounted to the filter post.

14. The flow control system of claim 13, wherein the filter post is formed integrally with one or more components of the service valve.

15. A flow control system for an irrigation sprinkler, the system comprising:
a service valve including:
a housing having;
a first fluid port; and
a second fluid port; and
a piston positioned at least partially within the housing and configured to rotate while linearly reciprocating with respect to the housing between first, second, and third positions, the piston having an inlet and an outlet;
a pilot valve in fluid communication with the second fluid port; and
a vent line in fluid communication with the first fluid port; wherein:
the outlet is in fluid communication with the first fluid port when the piston is in the first position;
the outlet is in fluid communication with the second fluid port when the piston is in the second position; and
the outlet is blocked when the piston is in the third position.

16. The flow control system of claim 15, further comprising a filter in fluid communication with the service valve.

17. The flow control system of claim 16, wherein the filter is configured to filter all water passing into the service valve via the inlet.

18. The flow control system of claim 16, wherein the filter comprises a post and a screen mounted to the post.

19. The flow control system of claim 18, wherein the post is formed integrally with one or more components of the service valve.

20. The flow control system of claim 18, wherein the post comprises one or more apertures.

* * * * *